(12) United States Patent
Mun et al.

(10) Patent No.: US 12,051,543 B2
(45) Date of Patent: Jul. 30, 2024

(54) MUTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Seon Jae Mun, Suwon-si (KR); Gi Long Kim, Suwon-si (KR); Tae Gyeom Lee, Suwon-si (KR); Byung Rok Ahn, Suwon-si (KR); Kyoung Jin Cha, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 38 days.

(21) Appl. No.: 17/745,215

(22) Filed: May 16, 2022

(65) Prior Publication Data

US 2022/0392703 A1 Dec. 8, 2022

(30) Foreign Application Priority Data

May 25, 2021 (KR) ........................ 10-2021-0066992
Dec. 29, 2021 (KR) ........................ 10-2021-0190586

(51) Int. Cl.
*H01G 4/012* (2006.01)
*H01G 4/248* (2006.01)
*H01G 4/30* (2006.01)

(52) U.S. Cl.
CPC ............. *H01G 4/012* (2013.01); *H01G 4/248* (2013.01); *H01G 4/30* (2013.01)

(58) Field of Classification Search
CPC ........ H01G 4/0085; H01G 4/30; H01G 4/012; H01G 4/1227; H01G 4/2325; H01G 4/1209; H01G 4/228; H01G 4/306; H01G 2/02; H01G 4/008; H01G 4/1218; H01G 4/232; H01G 4/248
See application file for complete search history.

(56) References Cited

U.S. PATENT DOCUMENTS

| | | | |
|---|---|---|---|
| 9,236,185 B1* | 1/2016 | Oguni | H01G 4/1227 |
| 2011/0110014 A1* | 5/2011 | Hirata | H01G 4/005 |
| | | | 156/89.12 |
| 2013/0049532 A1* | 2/2013 | Kim | H01C 7/18 |
| | | | 361/321.1 |
| 2014/0063685 A1* | 3/2014 | Lee | H01G 4/008 |
| | | | 361/301.4 |

(Continued)

FOREIGN PATENT DOCUMENTS

JP 2018-103509 A 7/2018
KR 10-2013-0024530 A 3/2013

*Primary Examiner* — Michael P McFadden
(74) *Attorney, Agent, or Firm* — MORGAN, LEWIS & BOCKIUS LLP

(57) ABSTRACT

There is provided a multilayer electronic component in which a short circuit between the internal electrodes, a decrease in capacitance, a decrease in breakdown voltage, and the like, may be suppressed by controlling an area fraction occupied by a region in which an intensity of brightness in a capacitance formation portion is 110% or more and 126% or less of an average value of an intensity of brightness of a cover portion.

33 Claims, 17 Drawing Sheets
(4 of 17 Drawing Sheet(s) Filed in Color)

(56) References Cited

U.S. PATENT DOCUMENTS

| | | | |
|---|---|---|---|
| 2014/0177133 A1* | 6/2014 | Lee | H01G 4/1209 |
| | | | 361/321.4 |
| 2014/0376150 A1* | 12/2014 | Kim | H01G 4/30 |
| | | | 361/301.4 |
| 2019/0259535 A1* | 8/2019 | Kowase | H01G 4/228 |
| 2021/0012968 A1* | 1/2021 | Taniguchi | H01G 4/30 |
| 2022/0102078 A1* | 3/2022 | Kitahara | H01G 4/1218 |

* cited by examiner

MUTILAYER ELECTRONIC COMPONENT AND METHOD OF MANUFACTURING THE SAME

CROSS-REFERENCE TO RELATED APPLICATION(S)

This application claims benefit of priority to Korean Patent Applications Nos. 10-2021-0066992 filed on May 25, 2021 and 10-2021-0190586 filed on Dec. 29, 2021 in the Korean Intellectual Property Office, the disclosures of which are incorporated herein by reference in its entirety.

TECHNICAL FIELD

The present disclosure relates to a multilayer electronic component and a method of manufacturing the same.

BACKGROUND

A multilayer ceramic capacitor (MLCC), a multilayer electronic component, is a chip-type condenser mounted on a printed circuit board of several electronic products such as an image display device, for example, a liquid crystal display (LCD) or a plasma display panel (PDP), a computer, a smartphone, and a mobile phone to serve to charge or discharge electricity therein or therefrom.

The multilayer ceramic capacitor may be used as a component of various electronic apparatuses because it has a small size, implements high capacitance, and may be easily mounted. In accordance with miniaturization and high output of various electronic apparatuses such as computers and mobile devices, demand for miniaturization and a capacitance increase of the multilayer ceramic capacitor has increased.

In order to miniaturize the multilayer ceramic capacitor and increase capacitance of the multilayer ceramic capacitor, a technology capable of forming internal electrodes and dielectric layers at small thicknesses is required.

However, as the thickness of the internal electrodes decreases, problems such as a short circuit between the internal electrodes, a decrease in capacitance, and a decrease in breakdown voltage may occur.

SUMMARY

An aspect of the present disclosure may provide a multilayer electronic component having excellent reliability.

An aspect of the present disclosure may also provide a multilayer electronic component in which internal electrode connectivity is uniform.

An aspect of the present disclosure may also provide a multilayer electronic component in which smoothness of internal electrodes is excellent.

An aspect of the present disclosure may also provide a multilayer electronic component having high reliability, a small size, and high capacitance.

An aspect of the present disclosure may also provide a method of manufacturing a multilayer electronic component having excellent productivity and excellent reliability.

However, an aspect of the present disclosure is not limited thereto, and may be more easily understood in a process of describing exemplary embodiments in the present disclosure.

According to an aspect of the present disclosure, a multilayer electronic component may include: a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, including a plurality of dielectric layers, and including a capacitance formation portion including a plurality of internal electrodes disposed alternately with the plurality of dielectric layers in the first direction and cover portions disposed on opposite end surfaces of the capacitance formation portion in the first direction; and external electrodes disposed on the body. SL may be 7.2 area % or less in which SL is a ratio of an area of NL to an area of ML, ML is a region excluding regions from opposite distal ends of the capacitance formation portion in the second direction to 35 μm from the capacitance formation portion of a region disposed in a center among regions obtained by trisecting a cross section of the body in the first and second directions in the first direction, and NL is a region in which an intensity of brightness in ML is 110% or more and 126% or less of an average value of an intensity of brightness of one of the cover portions in the first cross section.

According to another aspect of the present disclosure, a multilayer electronic component may include: a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, including a plurality of dielectric layers, and including a capacitance formation portion including a plurality of internal electrodes disposed alternately with the dielectric layers in the first direction and cover portions disposed on opposite end surfaces of the capacitance formation portion in the first direction; and external electrodes disposed on the body. A standard deviation of internal electrode connectivity measured in ML may be 1.5% or less in which the internal electrode connectivity is a ratio of lengths of portions in which one of the plurality of internal electrodes is actually formed to a length of the one of the plurality of internal electrodes, and ML is a region excluding regions from opposite distal ends of the capacitance formation portion in the second direction to 35 μm from the capacitance formation portion of a region disposed in a center among regions obtained by trisecting a cross section of the body in the first and second directions in the first direction.

According to another aspect of the present disclosure, a method of manufacturing a multilayer electronic component may include: applying an internal electrode paste to a sheet that is continuously supplied; forming internal electrode patterns by removing portions of the internal electrode paste applied to the sheet; transferring the internal electrode patterns to a ceramic green sheet that is continuously supplied to form the internal electrode patterns on the ceramic green sheet; stacking the ceramic green sheets on which the internal electrode patterns are formed to form a laminate; cutting the laminate to form a laminate unit; sintering the laminate unit to form a body; and forming external electrodes on the body to form a multilayer electronic component.

According to another aspect of the present disclosure, a multilayer electronic component may include: a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, including a plurality of dielectric layers, and including a capacitance formation portion including a plurality of internal electrodes disposed alternately with the plurality of dielectric layers in the first direction and cover portions disposed on opposite end surfaces of the capacitance formation portion in the first direction; and external electrodes disposed on the body. A CV value of internal electrode connectivity in ML may be 2.0% or less in which the internal electrode connectivity is a ratio of lengths of portions in which one of the plurality of internal electrodes is actually formed to a length of the one of the plurality of internal electrodes, and ML is a region excluding regions from opposite distal ends of the capacitance formation portion in the second direction to 35 μm from the capacitance formation portion of a region disposed in a center among regions obtained by trisecting a cross section of the body in the first and second directions in the first direction.

According to another aspect of the present disclosure, a method of manufacturing a multilayer electronic component may include: applying an internal electrode paste to a sheet, while the sheet is being conveyed from a first roller to a second roller; forming internal electrode patterns by removing portions of the internal electrode paste applied to the sheet; transferring the internal electrode patterns to a ceramic green sheet, while the ceramic green sheet is being conveyed from a third roller to a fourth roller; stacking the ceramic green sheets on which the internal electrode patterns are formed to form a laminate; cutting the laminate to form a laminate unit; sintering the laminate unit to form a body; and forming external electrodes on the body to form a multilayer electronic component.

BRIEF DESCRIPTION OF DRAWINGS

The patent or application file contains as least one drawing executed in color. Copies of this patent or patent application publication with color drawing(s) will be provided by the Office upon request and payment of the necessary fee.

The above and other aspects, features, and advantages of the present disclosure will be more clearly understood from the following detailed description taken in conjunction with the accompanying drawings, in which.

DETAILED DESCRIPTION

Figure 1:
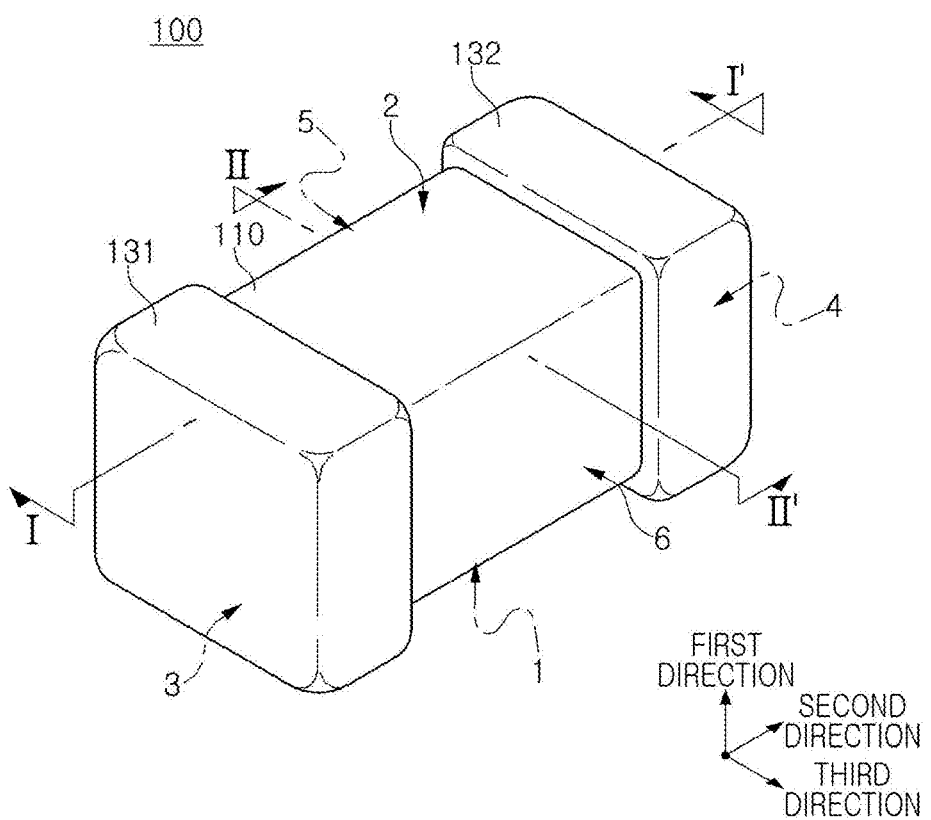
FIG. 1 is a schematic perspective view illustrating a multilayer electronic component according to an exemplary embodiment in the present disclosure.

In the drawings, a first direction may refer to a thickness T direction, a second direction may refer to a length L direction, and a third direction may refer to a width W direction.

Multilayer Electronic Component

Figure 2:
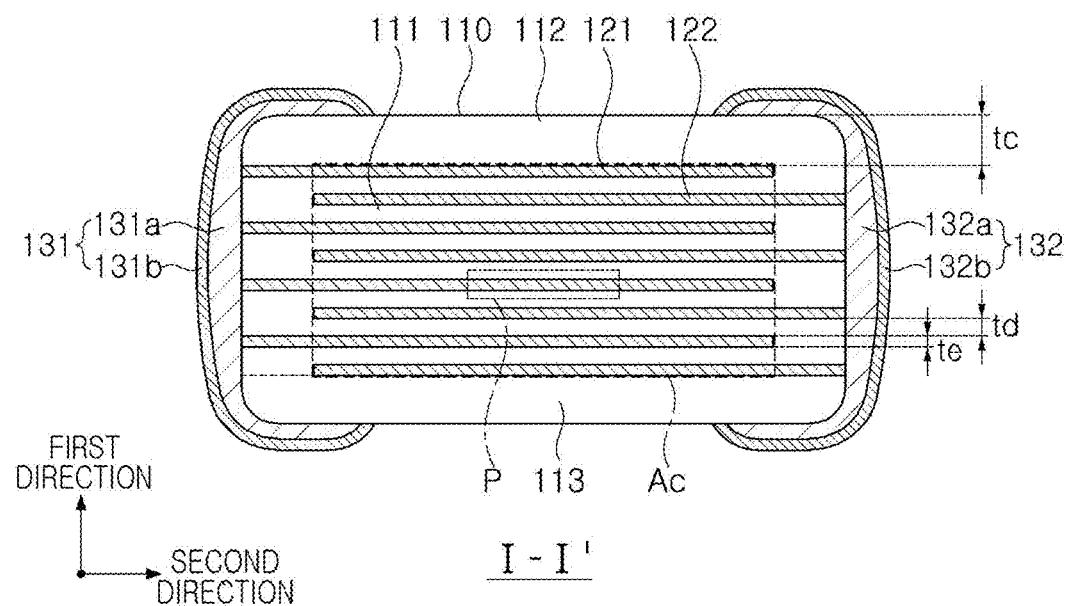
FIG. 2 is a cross-sectional view taken along line I-I' of FIG. 1.
Figure 3:
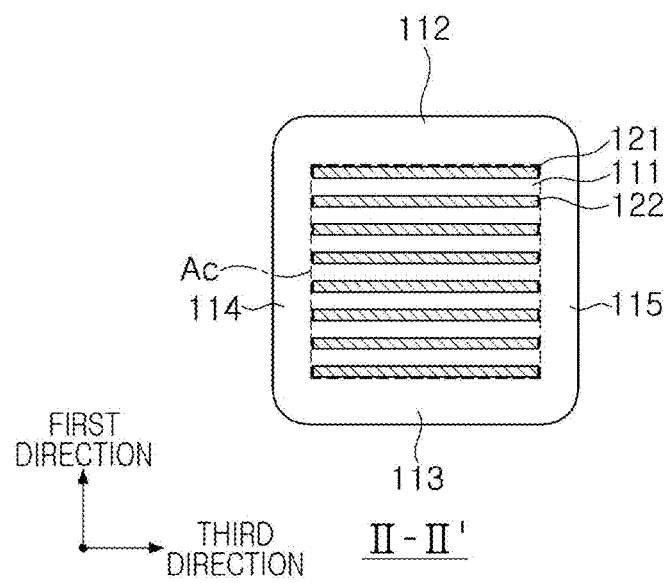
FIG. 3 is a cross-sectional view taken along line II-II' of FIG. 1.
Figure 4:
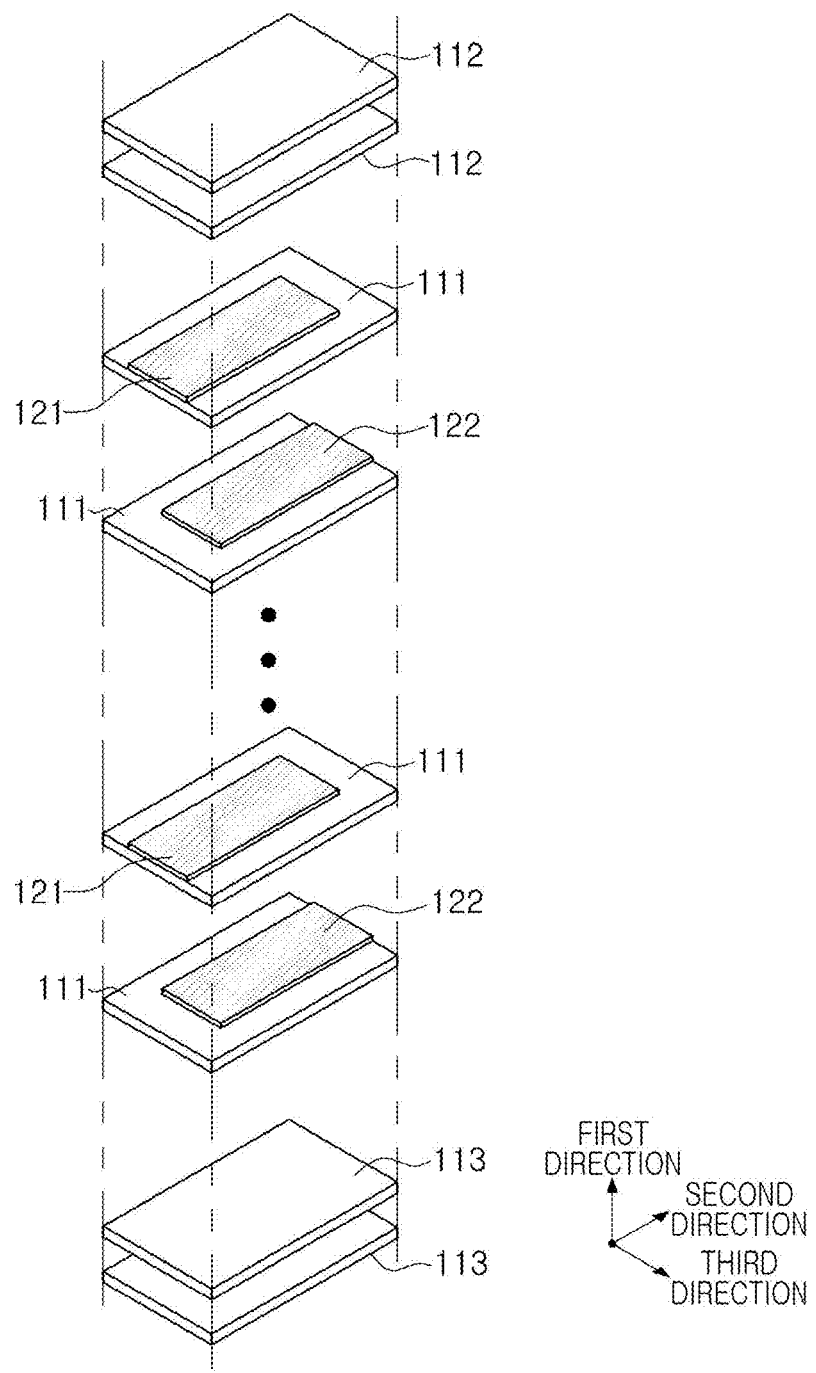
FIG. 4 is a schematic exploded perspective view illustrating a body in which dielectric layers and internal electrodes of FIG. 1 are stacked.
Figure 5:
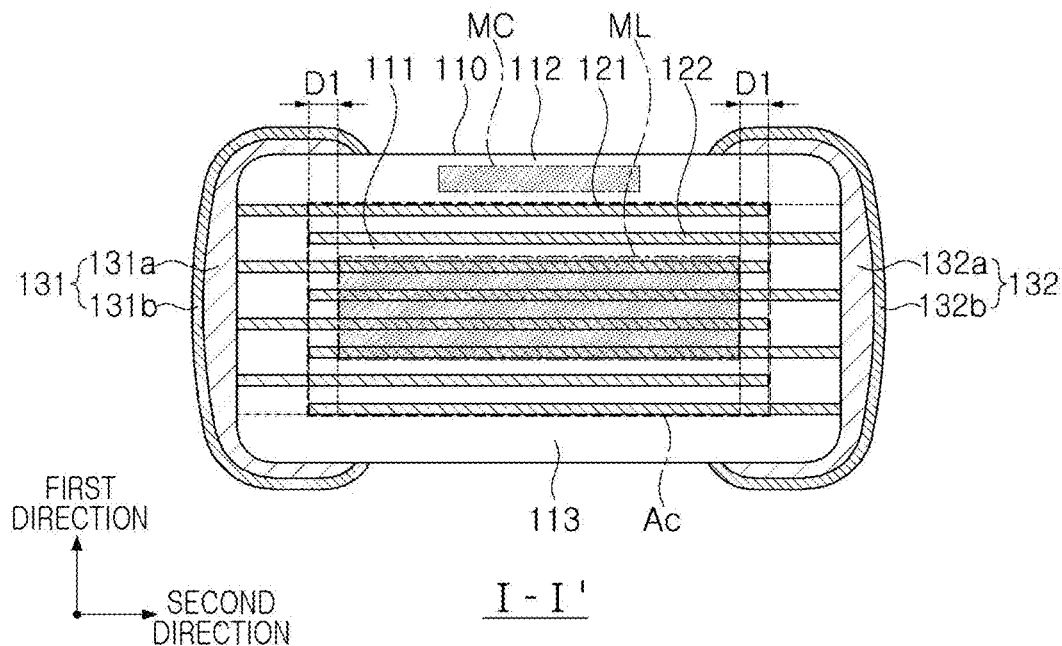
FIG. 5 is a cross-sectional view taken along line I-I' of FIG. 1, for describing a measurement region.
Figure 6:
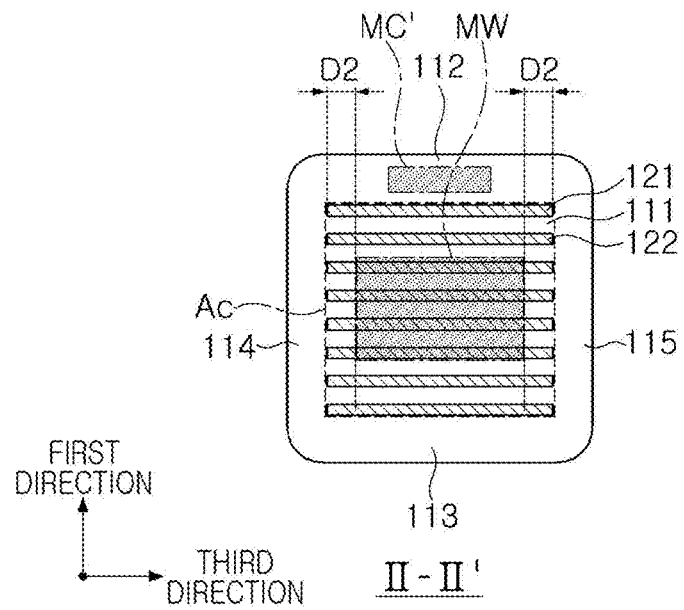
FIG. 6 is a cross-sectional view taken along line II-II' of FIG. 1, for describing a measurement region.

FIG. 1 is a schematic perspective view illustrating a multilayer electronic component according to an exemplary embodiment in the present disclosure. FIG. 2 is a cross-sectional view taken along line I-I' of FIG. 1. FIG. 3 is a cross-sectional view taken along line II-II' of FIG. 1. FIG. 4 is a schematic exploded perspective view illustrating a body in which dielectric layers and internal electrodes of FIG. 1 are stacked. FIG. 5 is a cross-sectional view taken along line I-I' of FIG. 1, for describing a measurement region. FIG. 6 is a cross-sectional view taken along line II-II' of FIG. 1, for describing a measurement region.

Hereinafter, a multilayer electronic component 100 according to an exemplary embodiment in the present disclosure will be described with reference to FIGS. 1 through 6.

The multilayer electronic component 100 according to an exemplary embodiment in the present disclosure may include: a body 110 having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, including a plurality of dielectric layers 111, and including a capacitance formation portion Ac including a plurality of internal electrodes 121 and 122 disposed to face each other in the first direction with a respective one of the dielectric layers interposed therebetween and cover portions 112 and 113 disposed on opposite end surfaces of the capacitance formation portion Ac in the first direction; and external electrodes 131 and 132 disposed on the body. SL may be 7.2 area % or less in which SL is a ratio of an area of NL to an area of ML, ML is a region excluding regions D1 from opposite distal ends of the capacitance formation portion in the second direction to 35 μm from the capacitance formation portion of a region disposed at the center among regions obtained by trisecting a cross section of the body in the first and second directions in the first direction, and NL is a region in which an intensity of brightness in ML is 110% or more and 126% or less of an average value of an intensity of brightness of the cover portion.

In order to miniaturize a multilayer ceramic capacitor, which is one of multilayer electronic components, and increase capacitance of the multilayer ceramic capacitor, a technology capable of forming internal electrodes and dielectric layers at small thicknesses is required. However, as the thickness of the internal electrodes decreases, problems such as a short circuit between the internal electrodes, a decrease in capacitance, and a decrease in breakdown voltage may occur.

As a result of examinations by the present inventors, it was confirmed that the reason why the problems such as the short circuit between the internal electrodes, the decrease in the capacitance, and the decrease in the breakdown voltage occur as the thickness of the internal electrodes decreases was that smoothness of the internal electrodes was decreased and internal electrode connectivity became non-uniform. However, in accordance with the miniaturization and the capacitance increase of the multilayer electronic component, the numbers of stacked internal electrodes and dielectric layers have gradually increased, such that a lot of effort and time have been required to quantitatively analyze connectivity of the internal electrodes included in the multilayer electronic component and the smoothness of the internal electrodes. Accordingly, the present inventors found that uniformity of the internal electrode connectivity and the smoothness of the internal electrodes were correlated with an area fraction SL of a region in which an intensity of brightness in ML of the capacitance formation portion Ac is 110% or more and 126% or less of an average value of an intensity of brightness of the cover portion, and found that the problems such as the short circuit between the internal electrodes, the decrease in the capacitance, and the decrease in the breakdown voltage may be solved by controlling SL, and as a result, have completed the present disclosure.

According to an exemplary embodiment in the present disclosure, by controlling the area fraction SL of the region in which the intensity of brightness in ML of the capacitance formation portion Ac is 110% or more and 126% or less of the average value of the intensity of brightness of the cover portion, the internal electrode connectivity may be uniformly secured, and the smoothness of the internal electrodes may be improved, such that the problems such as the short circuit between the internal electrodes, the decrease in the capacitance, and the decrease in the breakdown voltage may be solved.

Respective components of the multilayer electronic component 100 will hereinafter be described in detail.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in FIGS. 1 through 6. Although the body 110 does not have a hexahedral shape having perfectly straight lines due to shrinkage of ceramic powder particles included in the body 110 in a sintering process, the body 110 may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween may not be readily apparent without a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powder particles. Examples of the $BaTiO_3$-based ceramic powder particles may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1 and 0<y<1), $Ba(Ti_{1-y}Zr_y)O_3$ (0<y<1), or the like, in which calcium (Ca), zirconium (Zr), or the like, is partially solid-dissolved in $BaTiO_3$.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, an average thickness td of the dielectric layer 111 does not need to be particularly limited. For example, the average thickness td of the dielectric layer 111 may be 0.2 μm or more and 2 μm or less.

However, in general, when the dielectric layer is formed to have a small thickness less than 0.6 μm, in particular, when a thickness of the dielectric layer is 0.45 μm or less, reliability may be decreased.

According to an exemplary embodiment in the present disclosure, since the internal electrode connectivity is uniform and the smoothness of the internal electrode is excellent, excellent reliability may be ensured even when the average thickness of the dielectric layer 111 is 0.45 μm or less. Therefore, when the average thickness of the dielectric layer 111 is 0.45 μm or less, a reliability improvement effect according to the present disclosure may become more remarkable. Accordingly, the average thickness td of the dielectric layer 111 may be preferably 0.45 μm or less, and more preferably 0.4 μm or less.

The average thickness td of the dielectric layer 111 may refer to an average thickness of the dielectric layer 111 disposed between first and second internal electrodes 121 and 122.

The average thickness of the dielectric layer 111 may be measured from an image obtained by scanning a cross section of the body 110 in the length and thickness directions (L-T) with a scanning electron microscope (SEM) of 10,000 magnifications. More specifically, an average value may be measured by measuring thicknesses of one dielectric layer at 30 points positioned at equal intervals in the length direction in the obtained image. The 30 points positioned at equal intervals may be designated in the capacitance formation portion Ac. In addition, when an average thickness of ten dielectric layers is measured, the average thickness of the dielectric layers may further be generalized. Other methods and/or tools appreciated by one of ordinary skill in the art, even if not described in the present disclosure, may also be used.

The body 110 may include the capacitance formation portion Ac disposed in the body 110 and including the plurality of internal electrodes 121 and 122 disposed to face each other in the first direction with a respective one of the dielectric layers 111 interposed therebetween and the cover portions 112 and 113 disposed on opposite end surfaces of the capacitance formation portion Ac in the first direction, respectively.

In addition, the capacitance formation portion Ac, which contributes to forming capacitance of a multilayer ceramic capacitor, may be formed by repeatedly stacking a plurality of first and second internal electrodes 121 and 122 with a respective one of the dielectric layers 111 interposed therebetween. In addition, the capacitance formation portion Ac may refer a region in which the first internal electrodes 121 and the second internal electrodes 122 overlap each other.

The cover portions 112 and 113 may include an upper cover portion 112 disposed on an upper surface of the capacitance formation portion Ac in the first direction and a lower cover portion 113 disposed on a lower surface of the capacitance formation portion Ac in the first direction.

The upper cover portion 112 and the lower cover portion 113 may be formed by stacking a single dielectric layer or two or more dielectric layers on upper and lower surfaces of the capacitance formation portion Ac, respectively, in the thickness direction, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Meanwhile, an average thickness of the cover portion 112 or 113 does not need to be particularly limited. However, the average thickness of the cover portion 112 or 113 may be 15 μm or less in order to more easily achieve the miniaturization and the capacitance increase of the multilayer electronic component. The average thickness of the cover portion 112 or 113 may refer to a size of the cover portion 112 or 113 in the first direction, and may be an average value of sizes, in the first direction, of the upper cover portion 112 measured at five points positioned at equal intervals on the upper surface of the capacitance formation portion Ac or an average value of sizes, in the first direction, of the lower cover portion 113 measured at five points positioned at equal intervals on the lower surface of the capacitance formation portion Ac.

In addition, margin parts 114 and 115 may be disposed on side surfaces of the capacitance formation portion Ac.

The margin parts 114 and 115 may include a margin part 114 disposed on the fifth surface 5 of the body 110 and a margin part 115 disposed on the sixth surface 6. That is, the margin parts 114 and 115 may be disposed on opposite side surfaces of the ceramic body 110 in the width direction, respectively.

The margin parts 114 and 115 may refer to regions between both distal ends of the first and second internal electrodes 121 and 122 and boundary surfaces of the body 110 in a cross section of the body 110 cut in the width-thickness (W-T) directions, as illustrated in FIG. 3.

The margin parts 114 and 115 may basically serve to prevent damage to the internal electrodes due to physical or chemical stress.

The margin parts 114 and 115 may be formed by applying a conductive paste onto ceramic green sheets except for places where the margin parts are to be formed to form the internal electrodes.

Alternatively, in order to suppress a step due to the internal electrodes 121 and 122, the margin parts 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite side surfaces of the capacitance formation portion Ac in the width direction.

The internal electrodes 121 and 122 may be disposed alternately with the dielectric layer 111.

The internal electrodes 121 and 122 may include first and second internal electrodes 121 and 122 having different polarities, and the first and second internal electrodes 121 and 122 may be alternately disposed in the first direction with each of the dielectric layers 111 interposed therebetween.

Referring to FIG. 2, the first internal electrodes 121 may be spaced apart from the fourth surface 4 of the body 110 and be exposed through the third surface 3, and the second internal electrodes 122 may be spaced apart from the third surface 3 of the body 110 and be exposed through the fourth surface 4. The external electrodes 131 and 132 may be formed on the third and fourth surfaces 3 and 4 of the body 110, respectively, and may be connected to the internal electrode layers 121 and 122, respectively.

In this case, the first and second internal electrodes 121 and 122 may be electrically separated from each other by each of the dielectric layers 111 disposed therebetween.

Referring to FIG. 4, the body 110 may be formed by alternately stacking ceramic green sheets on which the first internal electrode 121 is printed and ceramic green sheets on which the second internal electrode 122 is printed and then sintering the stacked ceramic green sheets.

The number of stacked internal electrodes 121 and 122 may be 400 or more in order to realize a high-capacitance multilayer electronic component, but is not limited thereto.

SL may be 7.2 area % or less in which SL is the area fraction of the region in which the intensity of brightness in ML is 110% or more and 126% or less of the average value of the intensity of brightness of the cover portion, and ML is the region excluding the regions from the opposite distal ends of the capacitance formation portion Ac in the second direction to 35 μm from the capacitance formation portion Ac of the region disposed at the center among the regions obtained by trisecting the cross section of the body 110 in the first and second directions in the first direction. By making SL 7.2 area % or less, the internal electrode connectivity may be uniformly secured, and the smoothness of the internal electrodes 121 and 122 may be improved, such that the occurrence of the short circuit between the internal electrodes, the decrease in the capacitance, the decrease in the breakdown voltage, and the like, may be suppressed.

Figure 7:
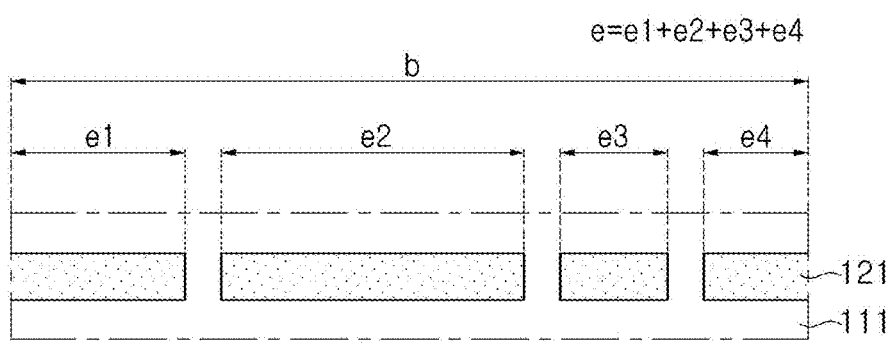
FIG. 7 is an enlarged view of region P of FIG. 2, for describing internal electrode connectivity.

Here, the internal electrode connectivity may be defined as a ratio of lengths of portions in which the internal electrode is actually formed to a length of the internal electrode. For example, when an entire length of the internal electrode measured at any one point of the internal electrode 121 is defined as b and lengths of the portions in which the internal electrode is actually formed are defined as e1, e2, e3, and e4, respectively, as illustrated in FIG. 7, the internal electrode connectivity may be expressed as a ratio of the sum (e=e1+e2+e3+e4) of the lengths of the portions in which the internal electrode is actually formed to the entire length b of the internal electrode. The smoothness may refer to a degree to which surfaces of the internal electrodes 121 and 122 are flat, and it may be determined that the more uniform the thickness of the internal electrodes 121 and 122, the higher the smoothness. The portions in which the internal electrode is actually formed are defined as electrode portions, and the portions between electrode portions are defined as disconnected portions. Also, the internal electrode connectivity may be expressed as a ratio of a length of the internal electrode excluding the disconnected portions to a length of the internal electrode including electrode portions and the disconnected portions on the cross section in the third and first directions or in the second and first directions. Also, the internal electrode connectivity may be expressed as a ratio of a length of the sum of lengths of electrode portions to a length of the internal electrode including electrode portions and the disconnected portions on the cross section in the third and first directions or in the second and first directions.

When SL exceeds 7.2 area %, the internal electrode connectivity may become non-uniform, and the internal electrode connectivity and the smoothness of the internal electrodes 121 and 122 may decrease.

The region in which the intensity of brightness is 110% or more and 126% or less of the average value of the intensity of brightness of the cover portion 112 or 113 may be a region in which the internal electrode connectivity is non-uniform or the thickness of the internal electrodes 121 and 122 is small. The capacitance formation portion Ac may include the internal electrodes 121 and 122, and may thus look brighter than the cover portions 112 and 113 at the time of being observed with a tool microscope, but a region in which the internal electrode connectivity is low or the thickness of the internal electrodes 121 and 122 is small in the capacitance formation portion Ac may be observed to be relatively dark, and in the region in which the intensity of brightness is 110% or more and 126% or less of the average value of the intensity of brightness of the cover portion, the problems such as the short circuit between the internal electrodes, the decrease in the capacitance, and the decrease in the breakdown voltage may occur.

Figure 16:
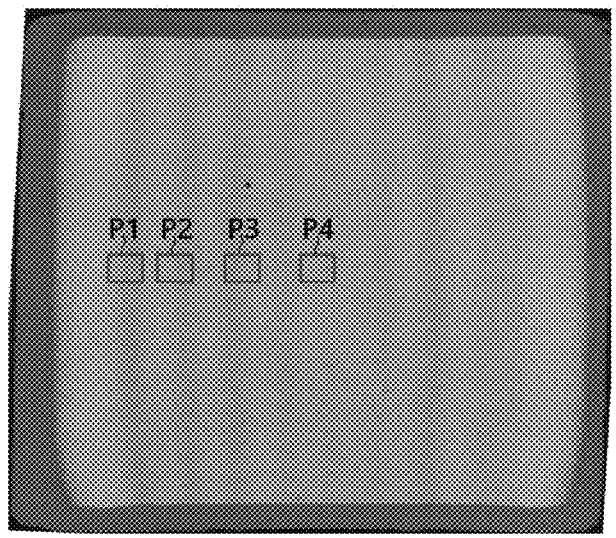
FIG. 16 is an image obtained by observing a cross-section of Test No. 5 in first and third directions with a tool microscope.
Figure 17:
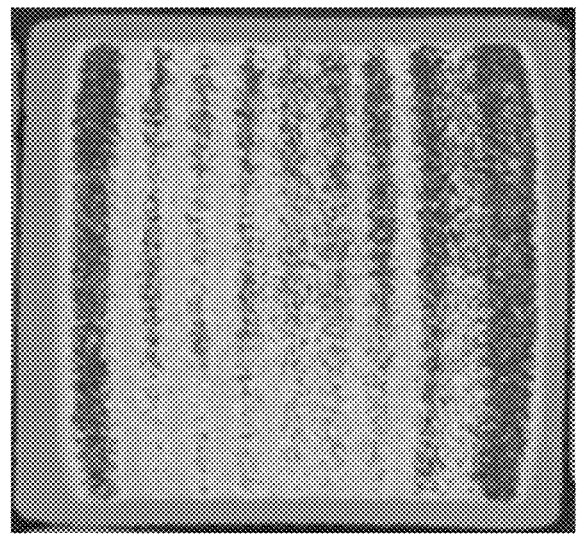
FIG. 17 is an image obtained by analyzing the image of FIG. 16 using SigmaScan Pro.

In addition, the uniformity of the internal electrode connectivity and the smoothness of internal electrodes may be greatly affected by smoothness of internal electrode patterns, and internal electrodes included in one chip may be generally formed by stacking ceramic green sheets on which internal electrode patterns are printed by the same printing method, and thus, regions in which the smoothness of the internal electrode patterns is low may overlap each other in a stacking direction (first direction). Accordingly, the region having the intensity of brightness of 110% or more and 126% or less of the average value of the intensity of brightness of the cover portion may form a line in the stacking direction, and such a defect may be referred to as a line defect. Referring to FIGS. 16 and 17, it may be confirmed that the region having the intensity of brightness of 110% or more and 126% or less of the average value of the intensity of brightness of the cover portion clearly forms a line in the stacking direction, resulting in a line defect. Hereinafter, the line defect may mean the region having the intensity of brightness of 110% or more and 126% or less of the average value of the intensity of brightness of the cover portion, and the occurrence of the line defect may mean that the area fraction of the region having the intensity of brightness of 110% or more and 126% or less of the average value of the intensity of brightness of the cover portion exceeds 7.2 area %.

Furthermore, in accordance with the miniaturization and the capacitance increase of the multilayer electronic component 100, thicknesses of the internal electrodes 121 and 122 and the dielectric layers 111 have been decreased and the numbers of stacked internal electrodes and dielectric layers have gradually increased, such that a lot of effort and time have been required to quantitatively analyze connectivity of the internal electrodes included in the multilayer electronic component and the smoothness of the internal electrodes. However, according to an exemplary embodiment in the present disclosure, by measuring the area fraction of the region having the intensity of brightness of 110% or more and 126% or less of the average value of the intensity of brightness of the cover portion 112 or 113, it may be determined whether or not the internal electrodes 121 and 122 have uniform internal electrode connectivity as a whole and whether the smoothness of the internal electrodes 121 and 122 is excellent as a whole. Accordingly, it may be ensured that the internal electrodes 121 and 122 included in the multilayer electronic component 100 have excellent internal electrode connectivity and excellent smoothness as a whole by a simple measurement method.

The intensity of brightness may be a value expressed as an intensity when an image of an object captured with an optical microscope is analyzed using an image analysis program, and may be a numerical value represented as a relative value of brightness. The image analysis program may be SigmaScan Pro, Olympus Stream Essentials 2.4, or the like, and the intensity may have a value in the range of 0 to 255.

A specific example of a method of measuring the average value of the intensity of brightness of the cover portion and SL will hereinafter be described, but it is to be noted that a method of measuring the intensity of brightness is not limited thereto.

Figure 8:
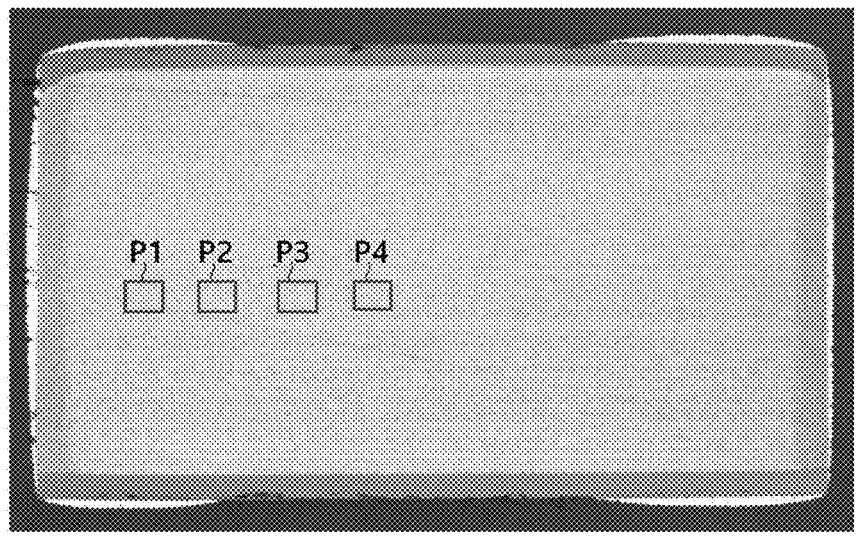
FIG. 8 is an image obtained by observing a cross-section of Test No. 1 in first and second directions with a tool microscope.
Figure 13:
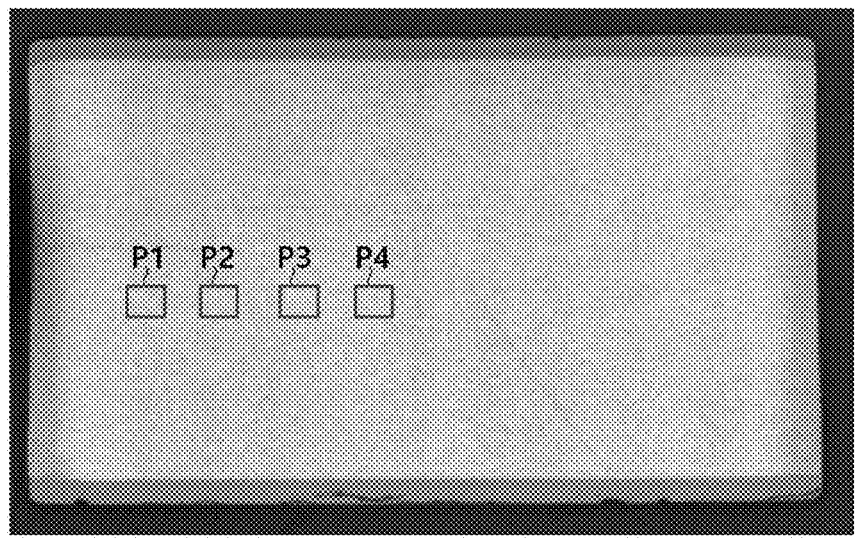
FIG. 13 is an image obtained by observing a cross-section of Test No. 4 in first and second directions with a tool microscope.

First, the body 110 may be polished up to the center thereof in the third direction to expose a cross section of the body in the first and second directions, and an optical image for the cross section of the body in the first and second directions observed at 100 magnification using a tool microscope may then be stored. In this case, a type of the tool microscope does not need to be particularly limited, and BX53M loaded with an Olympus Stream Essentials 2.4 program and available from Olympus Corporation may be used. An intensity of brightness of the optical image observed may vary depending on an observation environment, and when the observation environment is adjusted so that the brightness of the cover portion in the optical image has an intensity of 100 or more and 130 or less, the intensities of brightness of the cover portion and the capacitance formation portion may be more easily analyzed and compared with each other using SigmaScan Pro. FIGS. 8 and 13 are optical images obtained using BX53M available from Olympus Corporation by the above-described method. Meanwhile when the Olympus Stream Essentials 2.4 program, the SigmaScan Pro, and the like are used, the intensity of brightness may be confirmed, and in such programs, the intensity of brightness may be expressed as intensity.

Figure 9:
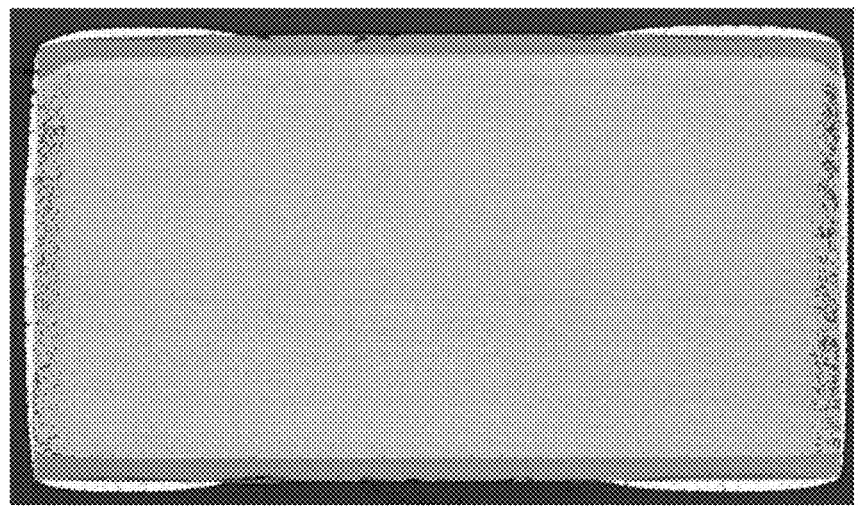
FIG. 9 is an image obtained by analyzing the image of FIG. 8 using SigmaScan Pro.
Figure 14:
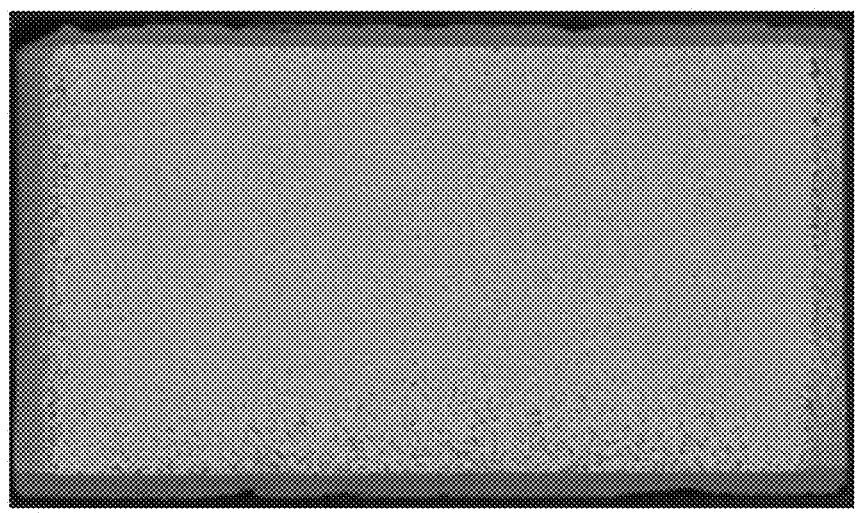
FIG. 14 is an image obtained by analyzing the image of FIG. 13 using SigmaScan Pro.

Thereafter, the optical image may be analyzed using the SigmaScan Pro. The SigmaScan Pro may be a program that provides an image analysis package for studying a structure and a size of visual information. Image conversion may be performed on the optical image through 'convert to gray scale' in a SigmaScan Pro menu. Thereafter, 'Line Intensity of Trace Measurement' may be set in the SigmaScan Pro menu, and an average value of the intensity of brightness of the cover portion 112 or 113 in a region MC of FIG. 5 may then be measured. Thereafter, a region having an intensity corresponding to 110% or more and 126% or less of the average value of the intensity of brightness of the cover portion 112 or 113 may be set to be indicated in a specific color, and an area fraction of the region having the specific color in an entire area of ML may then be measured to obtain SL. FIGS. 9 and 14 are optical images obtained using the SigmaScan Pro by the above-described method, and the region having the intensity corresponding to 110% or more and 126% or less of the average value of the intensity of brightness of the cover portion 112 or 113 is indicated in red.

Referring to FIG. 5, the region excluding the regions D1 from the opposite distal ends of the capacitance formation portion in the second direction to 35 µm from the capacitance formation portion Ac of the region disposed at the center among the regions obtained by trisecting the cross section of the body 110 in the first and second directions in the first direction may be referred to ML. A measurement region has been limited as described above in order to exclude regions that may be affected by the cover portions 112 and 113 or the margin parts in the length direction. Here, the capacitance formation portion Ac may refer to a region in which the first internal electrodes 121 and the second internal electrodes 122 overlap each other, and a region excluding regions in which the first and second internal electrodes do not overlap each other from a region from an internal electrode disposed at the uppermost portion in the first direction to an internal electrode disposed at the lowermost portion in the first direction may be referred to as a capacitance formation portion Ac. One distal end of the capacitance formation portion Ac in the second direction may refer to a region in which distal ends of the second internal electrodes 122 spaced apart from the third surface are connected to each other in the first direction, and the other distal end of the capacitance formation portion Ac in the second direction may refer to a region in which distal ends of the first internal electrodes 121 spaced apart from the fourth surface are connected to each other in the first direction.

In addition, the average value of the intensity of brightness of the cover portion 112 or 113 may be measured in a region MC disposed at the center among regions obtained by trisecting the cover portion 112 or 113 in the second direction, and may be measured in two regions disposed at the center among regions obtained by quadrisecting the cover portion 112 or 113 in the first direction in order to exclude outer sides of the body and regions adjacent to the capacity forming part Ac.

In an exemplary embodiment, SL may be 5.0 area % or less. By making SL to 5.0 area % or less, the internal electrode connectivity may be more uniformly ensured, and the smoothness of the internal electrodes 121 and 122 may be further improved.

Meanwhile, as SL becomes smaller, the internal electrode connectivity may be more uniformly secured, and the smoothness of the internal electrodes 121 and 122 may be further improved, and thus, a lower limit of SL is not particularly limited.

SW may be 7.2 area % or less in which SW is a ratio of an area of NW to an area of MW, MW is a region excluding regions from opposite distal ends of the capacitance formation portion in the third direction to 35 µm from the capacitance formation portion Ac of a region disposed at the center among regions obtained by trisecting a cross section of the body 110 in the first and third directions in the first direction, and NW is a region in which an intensity of brightness in MW is 110% or more and 126% or less of an average value of an intensity of brightness of the cover portion 112 or 113. By making SW 7.2 area % or less, the internal electrode connectivity may be uniformly secured, and the smoothness of the internal electrodes 121 and 122 may be improved, such that the occurrence of the short circuit between the internal electrodes, the decrease in the capacitance, the decrease in the breakdown voltage, and the like, may be suppressed. When SW exceeds 7.2 area %, the internal electrode connectivity may become non-uniform, and the internal electrode connectivity and the smoothness of the internal electrodes may decrease.

A specific example of a method of measuring the average value of the intensity of brightness of the cover portion 112 or 113 and SW will hereinafter be described, but it is to be noted that a method of measuring the intensity of brightness is not limited thereto.

Figure 11:
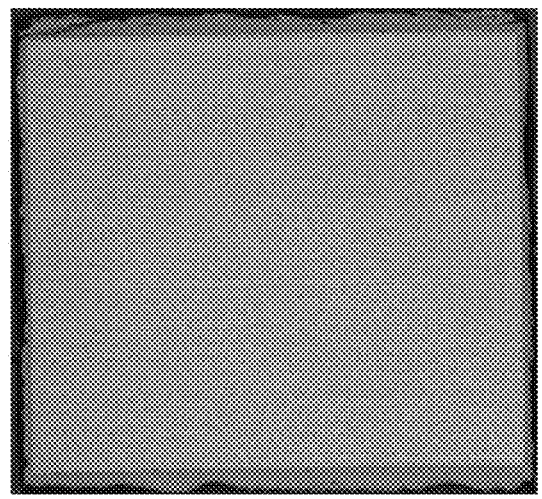
FIG. 11 is an image obtained by observing a cross-section of Test No. 1 in first and third directions with a tool microscope.

First, the body 110 may be polished up to the center thereof in the second direction to expose a cross section of the body in the first and third directions, and an optical image for the cross section of the body in the first and third directions observed at 100 magnification using a tool microscope may then be stored. FIGS. 11 and 16 are optical images obtained using BX53M available from Olympus Corporation by the above-described method.

Figure 12:
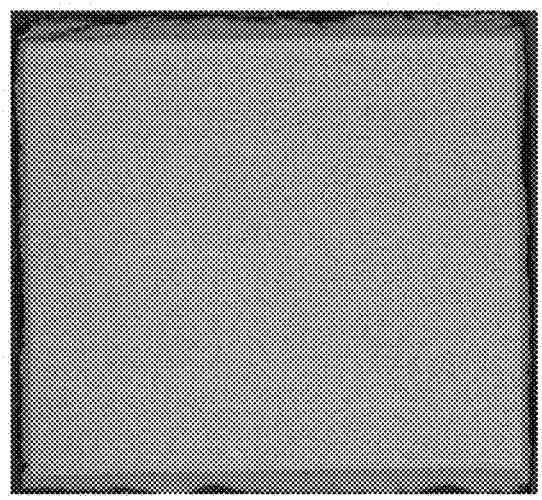
FIG. 12 is an image obtained by analyzing the image of FIG. 11 using SigmaScan Pro.

Thereafter, image conversion may be performed on the optical image through 'convert to gray scale' in a SigmaScan Pro menu. 'Line Intensity of Trace Measurement' may be set in the SigmaScan Pro menu, and an average value of the intensity of brightness of the cover portion 112 or 113 in a region MC' of FIG. 6 may then be measured. Thereafter, a region having an intensity corresponding to 110% or more and 126% or less of the average value of the intensity of brightness of the cover portion 112 or 113 may be set to be indicated in a specific color, and an area fraction of the region having the specific color in the entire area of MW may then be measured to obtain SW. FIGS. 12 and 17 are optical images obtained using the SigmaScan Pro by the above-described method, and the region having the intensity corresponding to 110% or more and 126% or less of the average value of the intensity of brightness of the cover portion 112 or 113 is indicated in red.

Referring to FIG. 6, the region excluding the regions D2 from the opposite distal ends of the capacitance formation portion in the third direction to 35 µm from the capacitance formation portion Ac of the region disposed at the center among the regions obtained by trisecting the cross section of the body 110 in the first and third directions in the first direction may be referred to MW. A measurement region has been limited as described above in order to exclude regions that may be affected by the cover portions 112 and 113 or the margin parts 114 and 115 in the width direction.

In addition, the average value of the intensity of brightness of the cover portion 112 or 113 may be measured in a region MC' disposed at the center among regions obtained by trisecting the cover portion 112 or 113 in the third direction, and may be measured in two regions disposed at the center among regions obtained by quadrisecting the cover portion 112 or 113 in the first direction in order to exclude outer sides of the body and regions adjacent to the capacity forming part Ac.

In an exemplary embodiment, SW may be 5.0 area % or less. By making SW to 5.0 area % or less, the internal electrode connectivity may be more uniformly ensured, and the smoothness of the internal electrodes 112 and 113 may be further improved.

Meanwhile, as SW becomes smaller, the internal electrode connectivity may be more uniformly secured, and the smoothness of the internal electrodes 112 and 113 may be further improved, and thus, a lower limit of SW is not particularly limited.

In an exemplary embodiment, both SL and SW may be 7.2 area % or less, and more preferably 5.0 area % or less.

There may be a case where a line defect is observed only in any one of one cross section of the body in the first and second directions and one cross section of the body in the first and third directions. Accordingly, by lowering the area fractions of the regions having the intensity of brightness of 110% or more and 126% or less of the average value of the intensity of brightness of the cover portion in both of the cross section of the body in the first and second directions and the cross section of the body in the first and third directions, it may be more clearly ensured that the internal electrodes 121 and 122 have uniform internal electrode connectivity as a whole and that the smoothness of the internal electrodes 121 and 122 is excellent as a whole.

In an exemplary embodiment, all of SLs measured in three cross sections of the body 110 cut in the first and second directions at three points having equal intervals in the third direction may be 7.2 area % or less.

When the line defect is observed only in the cross section of the body in the first and third directions, if SL is measured in only one cross section of the body in the first and second directions, there may be a case where SL is measured to be low. Accordingly, by making all of SLs measured in the three cross sections of the body 110 cut in the first and second directions at the three points having the equal intervals in the third direction 7.2 area % or less, it may be more clearly ensured that the internal electrodes 121 and 122 have the uniform internal electrode connectivity as a whole and that the smoothness of the internal electrodes 121 and 122 is excellent as a whole.

In an exemplary embodiment, all of SWs measured in three cross sections of the body 110 cut in the first and third directions at three points having equal intervals in the second direction may be 7.2 area % or less.

When the line defect is observed only in the cross section of the body in the first and second directions, if SW is measured in only one cross section of the body in the first and third directions, there may be a case where SW is measured to be low. Accordingly, by making all of SWs measured in the three cross sections of the body 110 cut in the first and third directions at the three points having the equal intervals in the second direction 7.2 area % or less, it may be more clearly ensured that the internal electrodes 121 and 122 have the uniform internal electrode connectivity as a whole and that the smoothness of the internal electrodes 121 and 122 is excellent as a whole.

In an exemplary embodiment, an average value of the internal electrode connectivity of the internal electrodes 112 and 113 disposed in ML may be 80% or more. That is, the average value of the internal electrode connectivity measured in ML may be 80% or more. Even though the internal electrode connectivity is uniform as a whole, when the average value of the internal electrode connectivity is excessively low, reliability may be decreased and capacitance may be decreased. Therefore, the average value of the internal electrode connectivity of the internal electrodes 112 and 113 disposed in ML may be preferably 80% or more, and more preferably 85% or more.

Here, the internal electrode connectivity may be defined as a ratio of lengths of portions in which the internal electrode is actually formed to a length of the internal electrode. For example, when an entire length of the internal electrode measured at any one point of the internal electrode 121 is defined as b and lengths of the portions in which the internal electrode is actually formed are defined as e1, e2, e3, and e4, respectively, as illustrated in FIG. 7, the internal electrode connectivity may be expressed as a ratio of the sum (e=e1+e2+e3+e4) of the lengths of the portions in which the internal electrode is actually formed to the entire length b of the internal electrode.

In an exemplary embodiment, a standard deviation of the internal electrode connectivity of the internal electrodes 121 and 122 disposed in ML may be 1.5% or less. That is, the standard deviation of the internal electrode connectivity measured in ML may be 1.5% or less. When the standard deviation of the internal electrode connectivity is 1.5% or less, the internal electrode connectivity may be uniform, and the occurrence of the short circuit between the internal electrodes, the decrease in the capacitance, the decrease in the breakdown voltage, and the like, may thus be suppressed. Accordingly, the standard deviation of the internal electrode connectivity of the internal electrodes 121 and 122 disposed in ML may be 1.5% or less, more preferably 1.3% or less, and even more preferably 1.1% or less.

In an exemplary embodiment, a CV value of the internal electrode connectivity of the internal electrodes 121 and 122 disposed in ML may be 2.0% or less. That is, the CV value of the internal electrode connectivity measured in ML may be 2.0% or less. When the CV value of the internal electrode connectivity is 2.0% or less, the internal electrode connectivity may be uniform, and the occurrence of the short circuit between the internal electrodes, the decrease in the capacitance, the decrease in the breakdown voltage, and the like, may thus be suppressed. Accordingly, the CV value of the internal electrode connectivity of the internal electrodes 121 and 122 disposed in ML may be 2.0% or less, more preferably 1.7% or less, and even more preferably 1.5% or less.

In an exemplary embodiment, an average value of the internal electrode connectivity of the internal electrodes 121 and 122 disposed in MW may be 80% or more. That is, the average value of the internal electrode connectivity measured in MW may be 80% or more. Even though the internal electrode connectivity is uniform as a whole, when the average value of the internal electrode connectivity is excessively low, reliability may be decreased and capacitance may be decreased. Therefore, the average value of the internal electrode connectivity of the internal electrodes disposed in MW may be preferably 80% or more, and more preferably 85% or more.

In an exemplary embodiment, a standard deviation of the internal electrode connectivity of the internal electrodes 121 and 122 disposed in MW may be 1.5% or less. That is, the standard deviation of the internal electrode connectivity measured in MW may be 1.5% or less. When the standard deviation of the internal electrode connectivity is 1.5% or less, the internal electrode connectivity may be uniform, and the occurrence of the short circuit between the internal electrodes, the decrease in the capacitance, the decrease in the breakdown voltage, and the like, may thus be suppressed. Accordingly, the standard deviation of the internal electrode connectivity of the internal electrodes 121 and 122 disposed in MW may be 1.5% or less, more preferably 1.3% or less, and even more preferably 1.1% or less.

In an exemplary embodiment, a CV value of the internal electrode connectivity of the internal electrodes 121 and 122 disposed in MW may be 2.0% or less. That is, the CV value of the internal electrode connectivity measured in MW may be 2.0% or less. When the CV value of the internal electrode connectivity is 2.0% or less, the internal electrode connectivity may be uniform, and the occurrence of the short circuit between the internal electrodes, the decrease in the capacitance, the decrease in the breakdown voltage, and the like, may thus be suppressed. Accordingly, the CV value of the internal electrode connectivity of the internal electrodes 121 and 122 disposed in MW may be 2.0% or less, more preferably 1.7% or less, and even more preferably 1.5% or less.

A method of measuring the average value, the standard deviation, and the CV value of the internal electrode connectivity is not particularly limited. As a specific example, the average value of the internal electrode connectivity disposed in MW may be obtained by measuring values of the internal electrode connectivity in any four regions P1, P2, P3, and P4 having a size of 70 μm×90 μm in MW, and then calculating an arithmetic mean of the measured values. In addition, a standard deviation and a CV value of the values of the internal electrode connectivity in the four regions may be the standard deviation and the CV value of the internal electrode connectivity, respectively. In this case, the standard deviation may be a value obtained using an STDEVP function in Excel program available from Microsoft Corporation, and the CV value (%) may be obtained by '(standard deviation/average)×100'.

Meanwhile, a material of each of the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for an internal electrode may be a screen printing method, a gravure printing method or the like, but is not limited thereto.

Meanwhile, an average thickness te of each of or one of the internal electrodes 121 and 122 does not need to be particularly limited. For example, the average thickness te of the each of or the one of the internal electrodes 121 and 122 may be 0.2 μm or more and 2 μm or less.

However, in general, when the internal electrode is formed to have a small thickness less than 0.6 μm, in particular, when a thickness of the internal electrode is 0.4 μm or less, reliability may be decreased.

According to an exemplary embodiment in the present disclosure, since the internal electrode connectivity is uniform and the smoothness of the internal electrode is excellent, excellent reliability may be ensured even when the average thickness of the internal electrodes 121 and 122 is 0.4 μm or less.

Accordingly, when the average thickness of each of the internal electrodes 121 and 122 is 0.4 μm or less, an effect of the multilayer electronic component according to the present disclosure may become more remarkable, and the miniaturization and the capacitance increase of the multilayer electronic component may be more easily achieved. Accordingly, the average thickness te of each of the internal electrodes 121 and 122 may be preferably 0.4 μm or less, and more preferably 0.35 μm or less.

The average thickness te of each of the internal electrodes 121 and 122 may refer to an average thickness of each of the first and second internal electrodes 121 and 122.

The average thickness of each of the internal electrodes 121 and 122 may be measured from an image obtained by scanning a cross section of the body 110 in the length and thickness directions (L-T) with a scanning electron microscope (SEM) of 10,000 magnifications. More specifically, an average value may be measured by measuring thicknesses of one internal electrode at 30 points positioned at equal intervals in the length direction in the obtained image. The 30 points positioned at equal intervals may be designated in the capacitance formation portion Ac. In addition, when an average thickness of ten internal electrodes is measured, the average thickness of the internal electrode layer may be further generalized.

The external electrodes 131 and 132 may be disposed on the third surface 3 and the fourth surface 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the margin parts 114 and 115 in the second direction, respectively.

A structure in which the multilayer electronic component 100 includes two external electrodes 131 and 132 has been described in the present exemplary embodiment, but the number, shape or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multilayer structure.

For example, the external electrodes 131 and 132 may include, respectively, electrode layers 131a and 132a disposed on the body 110, and plating layers 131b and 132b each disposed on the electrode layers 131a and 132a.

As a more specific example of the electrode layers 131a and 132a, the electrode layers 131a and 132a may be firing electrodes including a conductive metal and glass or resin-based electrodes including a conductive metal or a resin.

Alternatively, the electrode layers 131*a* and 132*a* may have a form in which firing electrodes and resin electrodes are sequentially formed on the body. In addition, the electrode layers 131*a* and 132*a* may be formed by a method of transferring a sheet including a conductive metal onto the body or be formed by a method of transferring a sheet including a conductive metal onto a firing electrode.

Alternatively, the electrode layers 131*a* and 132*a* may be formed by, for example, an atomic layer deposition (ALD) method, a molecular layer deposition (MLD) method, a chemical vapor deposition (CVD) method, a sputtering method, or the like.

The conductive metal used for the electrode layers 131*a* and 132*a* is not particularly limited as long as it is any material that may be electrically connected to the internal electrodes in order to form capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof.

The plating layers 131*b* and 132*b* may serve to improve mounting characteristics of the multilayer electronic component. A type of the plating layers 131*b* and 132*b* is not particularly limited. That is, each of the plating layers 131*b* and 132*b* may be a plating layer including one or more of Ni, Sn, Pd, and alloys thereof, and may be formed as a plurality of layers.

As a more specific example of the plating layers 131*b* and 132*b*, the plating layers 131*b* and 132*b* may be Ni plating layers or Sn plating layers, may have a form in which Ni plating layers and Sn plating layers are sequentially formed on the electrode layers 131*a* and 132*a*, respectively, or may have a form in which Sn plating layers, Ni plating layers, and Sn plating layers are sequentially formed. Alternatively, the plating layers 131*b* and 132*b* may include a plurality of Ni plating layers and/or a plurality of Sn plating layers.

A size of the multilayer electronic component 100 need not be particularly limited.

However, since the numbers of stacked dielectric layers and internal electrodes need to be increased by decreasing thicknesses of the dielectric layers and the internal electrodes in order to achieve both of the miniaturization and the capacitance increase of the multilayer electronic component, a reliability improving effect and a breakdown voltage improving effect according to the present disclosure in a multilayer electronic component 100 having a size of 0603 (length×width: 0.6 mm×0.3 mm) or less may become more remarkable.

Therefore, considering a manufacturing error, sizes of external electrodes, and the like, when a length of the multilayer electronic component 100 is 0.66 mm or less and a width of the multilayer electronic component 100 is 0.33 mm or less, the reliability improving effect according to the present disclosure may become more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

Meanwhile, according to an exemplary embodiment in the present disclosure, a multilayer electronic component may include: a body 110 having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, including a plurality of dielectric layers 111, and including a capacitance formation portion Ac including a plurality of internal electrodes 121 and 122 disposed to face each other in the first direction with each of the dielectric layers interposed therebetween and cover portions 112 and 113 disposed on opposite end surfaces of the capacitance formation portion in the first direction; and external electrodes 131 and 132 disposed on the body. A standard deviation of internal electrode connectivity measured in ML may be 1.5% or less in which the internal electrode connectivity is a ratio of lengths of portions in which the internal electrode is actually formed to a length of the internal electrode, and ML is a region excluding regions from opposite distal ends of the capacitance formation portion of the second direction to 35 μm from the capacitance formation portion Ac of a region disposed at the center among regions obtained by trisecting a cross section of the body in the first and second directions in the first direction.

In an exemplary embodiment, a standard deviation of internal electrode connectivity measured in MW is 1.5% or less in which MW is a region excluding regions from opposite distal ends of the capacitance formation portion in the third direction to 35 μm from the capacitance formation portion of a region disposed at the center among regions obtained by trisecting a cross section of the body 110 in the first and third directions in the first direction.

There may be a case where a line defect is observed only in any one of one cross section of the body in the first and second directions and one cross section of the body in the first and third directions. Accordingly, by making the standard deviations of the internal electrode connectivity measured in ML and MW 1.5% or less, it may be more clearly ensured that the internal electrodes 121 and 122 have the uniform internal electrode connectivity as a whole and that the smoothness of the internal electrodes 121 and 122 is excellent as a whole, and the occurrence of the short circuit between the internal electrodes, the decrease in the capacitance, the decrease in the breakdown voltage, and the like, may thus be suppressed.

In an exemplary embodiment, all of standard deviations of internal electrode connectivity measured in MLs of three cross sections of the body cut in the first and second directions at three points having equal intervals in the third direction may be 1.5% or less.

When the line defect is observed only in the cross section of the body in the first and third directions, if SL is measured in only one cross section of the body in the first and second directions, there may be a case where SL is measured to be low. Accordingly, by making all of the standard deviations of the internal electrode connectivity measured in MLs of the three cross sections of the body cut in the first and second directions at the three points having the equal intervals in the third direction 1.5% or less, it may be more clearly ensured that the internal electrodes 121 and 122 have the uniform internal electrode connectivity as a whole and that the smoothness of the internal electrodes 121 and 122 is excellent as a whole.

In an exemplary embodiment, average values of the internal electrode connectivity measured in ML and MW may be 80% or more.

In an exemplary embodiment, CV values of the internal electrode connectivity of the internal electrodes 121 and 122 measured in ML and MW may be 2.0% or less.

In an exemplary embodiment, SL and SW may be 7.2 area % or less in which SL is a ratio of an area of NL to an area of ML, NL is a region in which an intensity of brightness in ML is 110% or more and 126% or less of an average value of an intensity of brightness of the cover portion 112 or 113, SW is a ratio of an area of NW to an area of MW, and NW is a region in which an intensity of brightness in MW is 110% or more and 126% or less of an average value of an intensity of brightness of the cover portion 112 or 113.

Method of Manufacturing Multilayer Electronic Component

A method of manufacturing a multilayer electronic component capable of more easily manufacturing the multilayer electronic component 100 according to an exemplary embodiment in the present disclosure described above, shortening a manufacturing time, and mass-producing the multilayer electronic component will be described.

However, it is to be noted that a method of manufacturing the multilayer electronic component 100 according to an exemplary embodiment in the present disclosure described above is not limited to a method described below.

Figure 20:
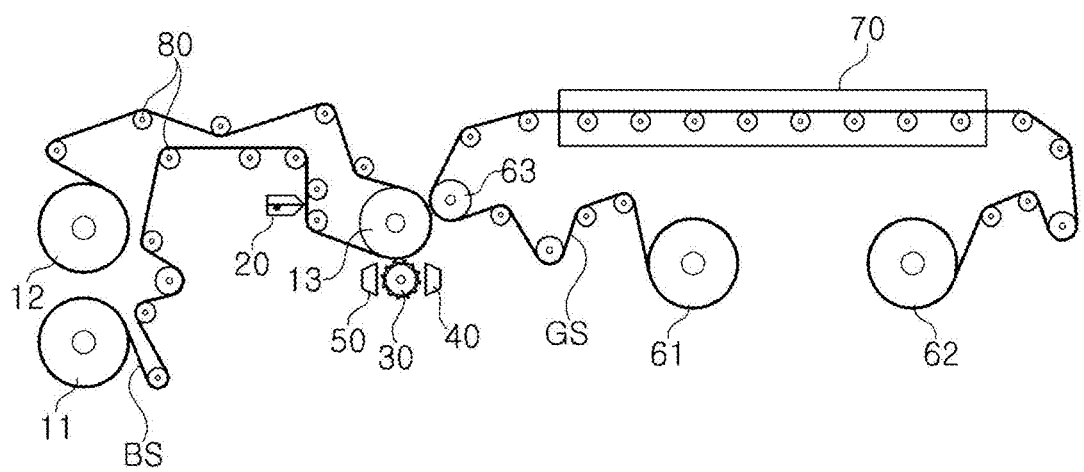
FIG. 20 is a schematic view illustrating a method of manufacturing a multilayer electronic component according to an exemplary embodiment in the present disclosure.
Figure 21:
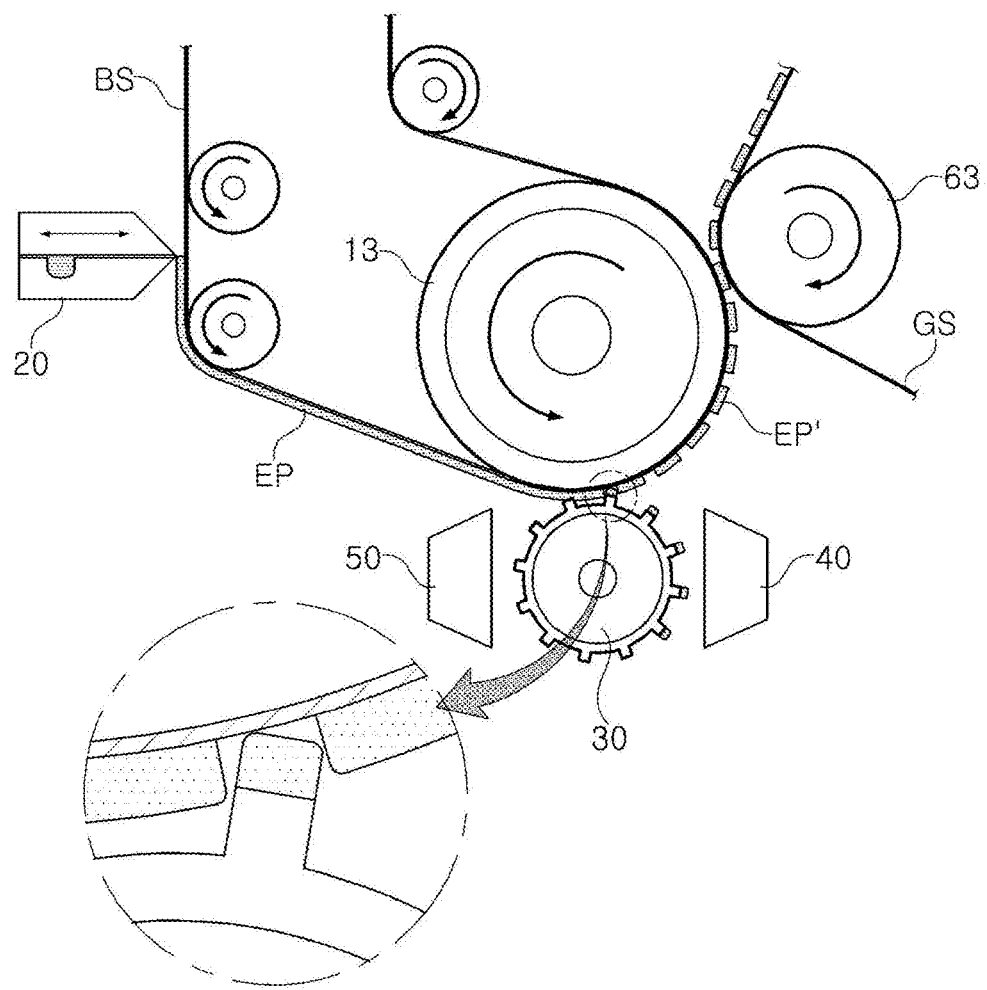
FIG. 21 is an enlarged view of a portion of FIG. 20.
Figure 22:
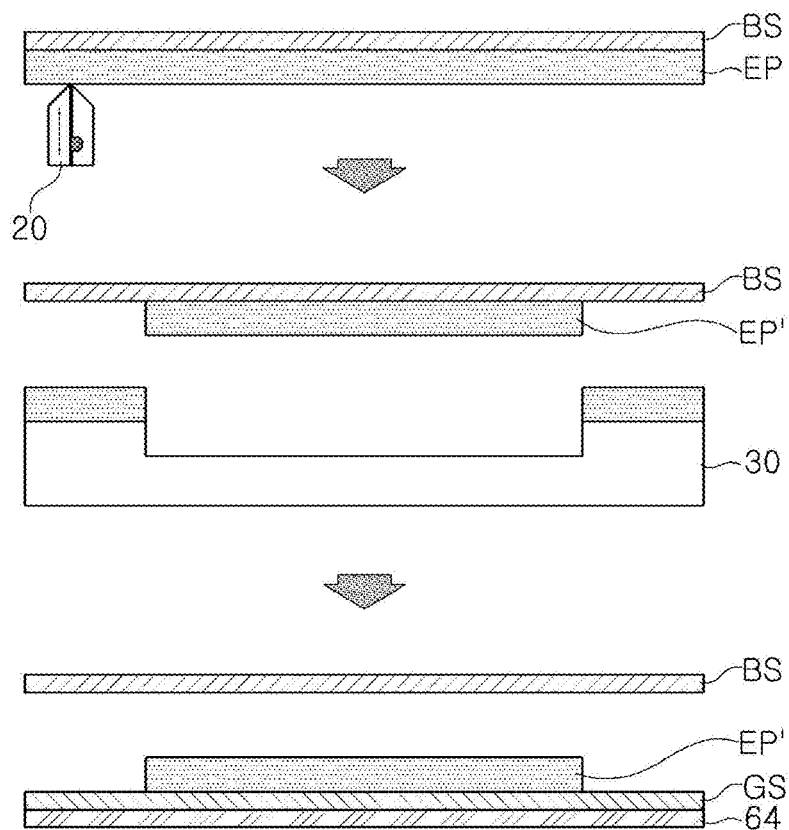
FIG. 22 is a schematic view for describing reverse off-set printing.
Figure 23:
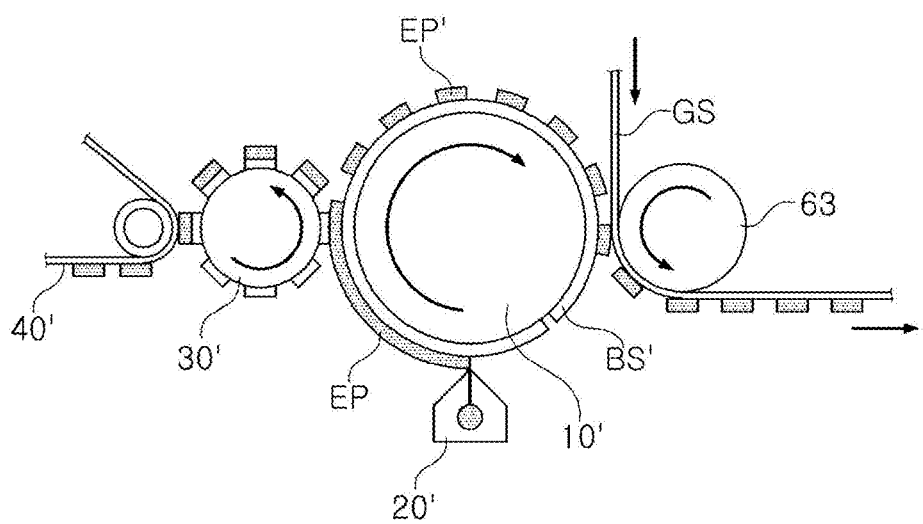
FIG. 23 is a schematic view for describing reverse off-set printing according to the related art.

FIG. 20 is a schematic view illustrating a method of manufacturing a multilayer electronic component according to an exemplary embodiment in the present disclosure. FIG. 21 is an enlarged view of a portion of FIG. 20. FIG. 22 is a schematic view for describing reverse off-set printing. FIG. 23 is a schematic view for describing reverse off-set printing according to the related art.

A method of manufacturing a multilayer electronic component according to an exemplary embodiment in the present disclosure will be described in detail with reference to FIGS. 20 through 23.

A method of manufacturing a multilayer electronic component according to an exemplary embodiment in the present disclosure may include: applying an internal electrode paste EP to a sheet BS that is continuously supplied; forming internal electrode patterns EP' by removing portions of the internal electrode paste applied to the sheet; transferring the internal electrode patterns EP' to a ceramic green sheet GS that is continuously supplied to print the internal electrode patterns EP' on the ceramic green sheet; stacking the ceramic green sheets GS on which the internal electrode patterns EP' are printed to form a laminate; cutting the laminate to obtain a laminate unit; sintering the laminate unit to obtain a body; and forming external electrodes on the body to obtain a multilayer electronic component.

A method of printing the internal electrode patterns on the ceramic green sheet may include gravure printing, screen printing, reverse off-set printing, and the like.

FIG. 23 is a schematic view for describing reverse off-set printing. Referring to FIG. 23, in the reverse off-set printing, the internal electrode paste EP may be applied to an entire surface of a blanket sheet BS. Then, the internal electrode patterns EP' may be formed by removing portions of the applied internal electrode paste EP with a cliché roll 30. Then, the internal electrode patterns EP' may be transferred to the ceramic green sheet GS to be printed on the ceramic green sheet.

The reverse off-set printing does not use a design with a mesh mask or a halftone dot unlike the gravure printing and the screen printing, and applies the internal electrode paste EP onto the entire surface of the blanket sheet BS, and may thus be advantageous in uniformly and smoothly applying the internal electrode paste EP.

However, referring to FIG. 23, which is the schematic view for describing the reverse off-set printing according to the related art, the reverse off-set printing according to the related art, which is a method of wrapping a circular blanket roll 10' with a blanket sheet BS', applying the internal electrode paste EP to a surface of the blanket sheet BS', forming the internal electrode patterns EP' using the cliché roll 30', and transferring the internal electrode patterns EP' on the surface of the blanket sheet BS' to the ceramic green sheet GS, was an intermittent printing method rather than continuous printing. As a part of the internal electrode paste EP is attached to the cliché roll 30', the internal electrode pattern EP' may be formed, and the part of the inner electrode paste attached to the cliché roll 30' may be removed by using the cliché roll washing apparatus 40'.

Such reverse off-set printing according to the related art was suitable for low-speed printing, but was unsuitable for high-speed printing, such that a manufacturing time increased and thus, productivity decreased.

In addition, in the reverse off-set printing according to the related art, which is a method of repeatedly reusing the blanket sheet BS' wrapping the circular blanket roll 10', characteristics of the surface of the blanket sheet BS' might change, such that a condition of the surface of the blanket sheet BS' was not constant, and thus, uniformity and smoothness of the internal electrode patterns EP' might be decreased. Specifically, a probability of the occurrence of foreign materials on the surface of the blanket sheet BS' due to the repeated reuse of the blanket sheet BS' was continuously increased, and the internal electrode paste EP remained, such that uniformity and smoothness of the internal electrode patterns EP' might be decreased. In addition, the blanket sheet BS' might serve to allow the internal electrode paste EP to be transferred in a dry state by absorbing a solvent of the internal electrode paste EP, but such an effect was gradually decreased due to the repeated reuse of the blanket sheet BS.

On the other hand, with the method of manufacturing a multilayer electronic component according to an exemplary embodiment in the present disclosure, since the sheet BS is continuously supplied, the sheet BS may not be reused, and thus, the problem of the reverse off-set printing according to the related art described above may be solved. That is, with the method of manufacturing a multilayer electronic component according to an exemplary embodiment in the present disclosure, the high-speed printing may be possible, and the characteristics of the surface of the sheet BS may be maintained to be constant, such that the uniformity and the smoothness of the internal electrode patterns may be improved. In addition, the sheet BS may serve to allow the internal electrode paste EP to be transferred in a dry state by absorbing a solvent of the internal electrode paste EP, such that fluidity of the internal electrode paste EP may be significantly decreased without a separate drying process, and thus, the uniformity and the smoothness of the internal electrode patterns EP' may be improved.

Respective steps of the method of manufacturing a multilayer electronic component according to an exemplary embodiment in the present disclosure will hereinafter be described.

Internal Electrode Paste Applying Step

The internal electrode paste EP may be applied to the sheet BS that is continuously supplied. According to the present disclosure, since the sheet BS is continuously supplied, the high-speed printing may be possible, and the characteristics of the surface of the sheet BS may be maintained to be constant, such that the uniformity and the smoothness of the internal electrode patterns EP' may be improved. In addition, the sheet BS may serve to allow the internal electrode paste EP to be transferred in the dry state by absorbing the solvent of the internal electrode paste EP, such that the fluidity of the internal electrode paste EP may be significantly decreased without the separate drying process, and thus, the uniformity and the smoothness of the internal electrode patterns EP' may be improved.

A method of continuously supplying the sheet BS does not need to be particularly limited. In an exemplary embodiment, the sheet BS may be fed continuously by moving from a roll 11 around which the sheet is wound to a roll 12 rewinding the sheet. Moving rolls 80 may be disposed in intermediate regions in which the sheet BS moves from the roll 11 on which the sheet BS is wound to the roll 12 rewinding the sheet BS to allow the sheet BS to be stably supplied.

In this case, the sheet BS may be a blanket sheet. A type of the blanket sheet does not need to be particularly limited, and may be a blanket sheet formed of a material generally used in the related art.

A method of applying the internal electrode paste EP is not particularly limited. For example, the internal electrode paste EP may be applied using a die coater 20. The die coater 20 may apply the internal electrode paste EP to the sheet through a slit, and a thickness of the internal electrode paste EP applied to the sheet BS may be adjusted by adjusting a distance between the die coater 20 and the sheet BS.

Internal Electrode Pattern Forming Step

Then, the internal electrode patterns EP' may be formed by removing portions of the internal electrode paste applied to the sheet BS.

In this case, the internal electrode patterns EP' may be formed by removing portions of the internal electrode paste applied to the sheet using the cliché roll 30.

The cliché roll 30 may have concave portions corresponding to the internal electrode patterns EP' and have convex portions corresponding to regions to be removed.

The blanket sheet BS to which the internal electrode paste EP is applied may pass between the cliché roll 30 and a blanket roll 13, and the cliché roll 30 may rotate in an opposite direction to a rotation direction of the blanket roll 13 to apply a pressure to the blanket sheet BS, such that portions of the internal electrode paste EP may be attached to and removed by the convex portions of the cliché roll 30, resulting in the internal electrode patterns EP'.

A cleaning unit 40 and a drying unit 50 may be disposed on both side surfaces of the cliché roll 30, respectively, the internal electrode pastes EP attached to the convex portions of the cliché roll 30 may be removed and cleaned by the cleaning unit 40, and the cliché roll 30 may be dried by the drying unit 50.

Internal Electrode Pattern Printing Step

Then, the internal electrode patterns EP' on the sheet BS may be transferred to the ceramic green sheet GS that is continuously supplied to be printed on the ceramic green sheet GS.

The ceramic green sheet GS may be continuously supplied by moving from a roll 61 on which the ceramic green sheet GS is wound to a roll 62 rewinding the ceramic green sheet GS. Moving rolls may be disposed in intermediate regions in which the ceramic green sheet GS moves from the roll 61 on which the ceramic green sheet GS is wound to the roll 62 rewinding the ceramic green sheet to allow the ceramic green sheet GS to be stably supplied. The ceramic green sheet GS may be disposed on a base film 64.

The sheet BS on which the internal electrode patterns EP' are disposed may pass between the blanket roll 13 and a press roll 63, and the press roll 63 may rotate in an opposite direction to a rotation direction of the blanket roll 13 to apply a pressure to the ceramic green sheet GS, such that the internal electrode patterns EP' may be transferred onto the ceramic green sheet GS.

Thereafter, the ceramic green sheet GS on which the internal electrode patterns EP' are printed may be dried while passing through a drying device 70.

In an exemplary embodiment, a thickness deviation of the internal electrode pattern EP' may be 0.1 µm or less. By making the thickness deviation of the internal electrode pattern EP' 0.1 µm or less, connectivity of the internal electrodes after the sintering may be more uniformly secured, and the internal electrodes 121 and 122 having excellent smoothness may be formed.

Figure 24:
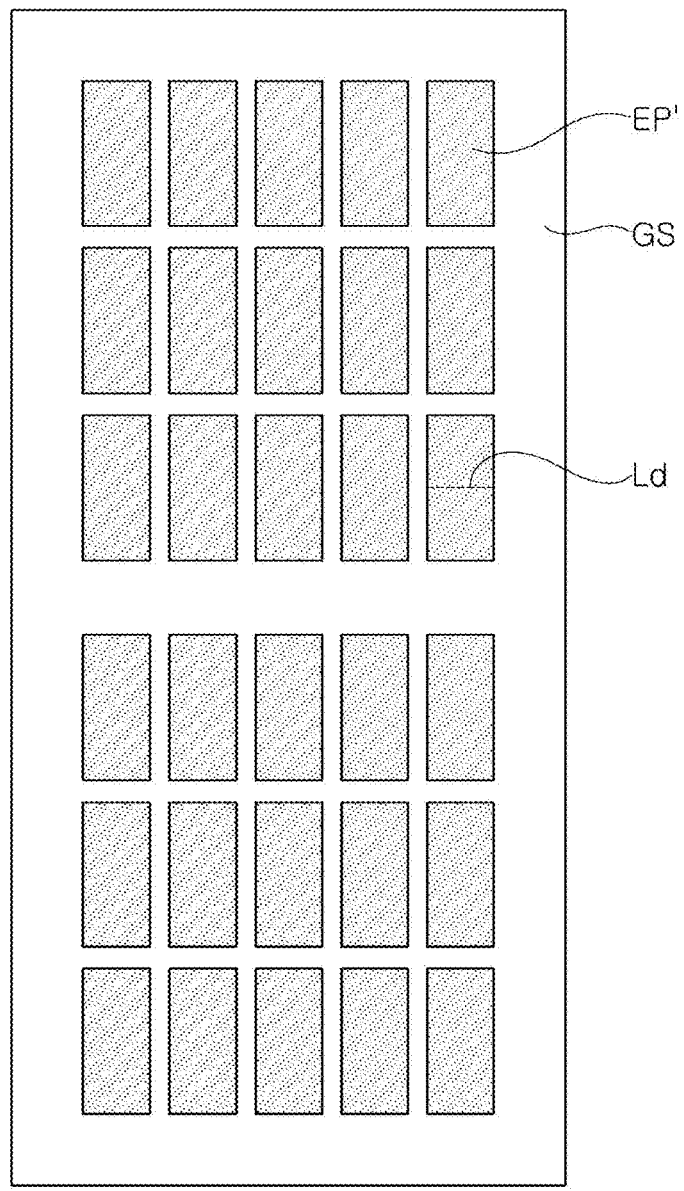
FIG. 24 is a view illustrating a ceramic green sheet on which internal electrode patterns are printed.
Figure 25:
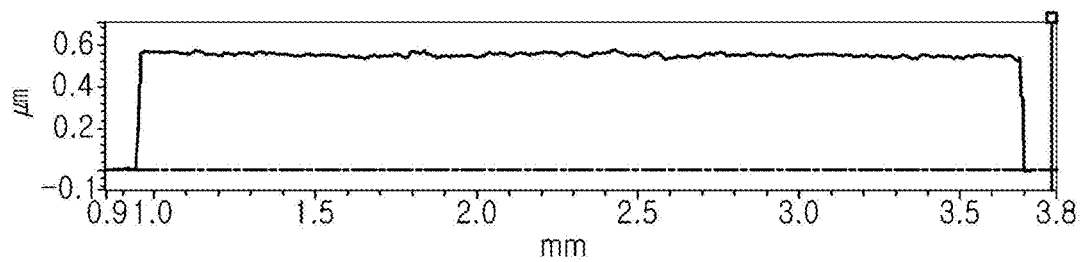
FIG. 25 is a graph illustrating a measurement result obtained by measuring a thickness of the internal electrode pattern along a dotted line of FIG. 24 when the internal electrode patterns are printed according to a manufacturing method according to the present disclosure.

Referring to FIG. 24, which is a view illustrating a ceramic green sheet GS on which internal electrode patterns EP' are printed, when viewed from above, and FIG. 25, which is a graph illustrating a measurement result obtained by measuring a thickness of the internal electrode pattern along a dotted line Ld of FIG. 24 when the internal electrode patterns EP' are printed by a manufacturing method according to the present disclosure, it may be confirmed that a difference between a maximum thickness and a minimum thickness of the internal electrode pattern EP' is 0.1 µm or less, and thus, a thickness of the internal electrode pattern EP' is very uniformly.

Figure 26:
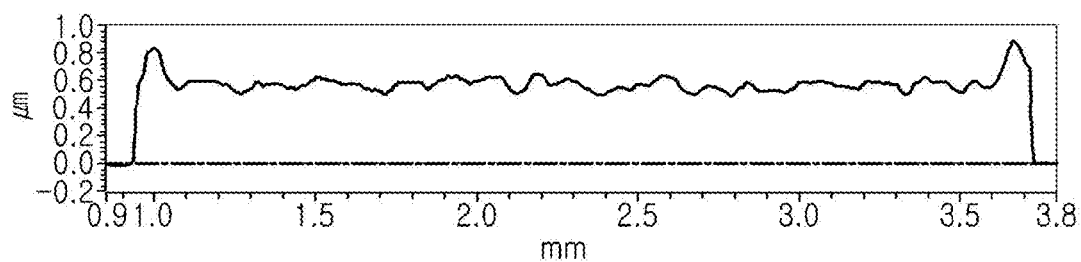
FIG. 26 is a graph illustrating a measurement result obtained by measuring a thickness of the internal electrode pattern along a dotted line of FIG. 24 when the internal electrode patterns are printed according to a gravure printing method.

On the other hand, referring to FIG. 26, which is a graph illustrating a measurement result obtained by measuring a thickness of the internal electrode pattern along a dotted line Ld of FIG. 24 when the internal electrode patterns are printed by a gravure printing method, it may be confirmed that a saddle phenomenon in which end portions of the internal electrode patterns become thicker than a central portion of the internal electrode pattern occurs, and a difference between a maximum thickness and a minimum thickness of the internal electrode pattern is 0.2 µm or more, and thus, a thickness of the internal electrode pattern is non-uniform.

An average thickness of the internal electrode pattern EP' does not need to be particularly limited, and may be determined in consideration of a thickness of each of internal electrodes 121 and 122 to be obtained.

However, in general, when the internal electrode is formed to have a small thickness less than 0.6 µm, in particular, when a thickness of the internal electrode is 0.4 µm or less, reliability may be decreased.

According to an exemplary embodiment in the present disclosure, since the thickness of the internal electrode patterns EP' is uniform and smoothness of the internal electrode patterns EP' is excellent, the internal electrodes of which the internal electrode connectivity is uniform and the smoothness is excellent may be obtained. Therefore, even when the average thickness of the internal electrodes after the sintering is 0.4 µm or less, excellent reliability may be secured.

Accordingly, by controlling the average thickness of the internal electrode patterns EP', when the average thickness of the internal electrodes is 0.4 µm or less, an effect of the multilayer electronic component according to the present disclosure may become more remarkable, and the miniaturization and the capacitance increase of the multilayer electronic component may be more easily achieved.

An average thickness of the ceramic green sheet GS does not need to be particularly limited, and may be determined in consideration of a thickness of each of dielectric layers 111 to be obtained.

However, according to an exemplary embodiment in the present disclosure, since the thickness of the internal electrode patterns EP' is uniform and smoothness of the internal electrode patterns EP' is excellent, the internal electrodes of which the internal electrode connectivity is uniform and the smoothness is excellent may be obtained, and even when the average thickness of the dielectric layer 111 is 0.45 μm or less, excellent reliability may be secured.

Accordingly, by controlling the average thickness of the ceramic green sheet GS, when the average thickness of the dielectric layer 111 after the sintering is 0.45 μm or less, an effect of the multilayer electronic component according to the present disclosure may become more remarkable, and the miniaturization and the capacitance increase of the multilayer electronic component may be more easily achieved.

Body Forming Step

Then, the ceramic green sheets GS on which the internal electrode patterns EP' are printed may be stacked to form the laminate. The laminate may be pressurized and compressed from the stacking direction (first direction).

Then, the laminate may be cut to a size corresponding to the body 110 of one multilayer electronic component 100 to obtain a laminate unit. In this case, the laminate may be cut so that one ends of the internal electrode patterns EP' are alternately exposed through opposite end surfaces of the laminate unit in the second direction.

Then, the laminate unit may be sintered to obtain the body 110.

External Electrode Forming Step

Then, the external electrodes 131 and 132 may be formed on the body 110 to manufacture the multilayer electronic component 100.

A method of forming the external electrodes 131 and 132 is not particularly limited, and the external electrodes 131 and 132 may be formed by a method of dipping the body 110 into a paste including a conductive metal and glass or may be formed by a method of transferring a sheet including a conductive metal. In addition, the external electrodes may be formed using a paste including a conductive metal and a resin, or may be formed by an atomic layer deposition (ALD) method, a molecular layer deposition (MLD) method, a chemical vapor deposition (CVD) method, a sputtering method, or the like.

In addition, a plating process may be additionally performed to allow the external electrodes to include the plating layers 131b and 132b, respectively.

Inventive Example

In order to confirm an effect according to a line defect area ratio, sample chips having different line defect area ratios were prepared. Here, a line defect refers to a region having an intensity of brightness of 110% or more and 126% or less of an average value of an intensity of brightness of the cover portion.

In Table 1, a manufacturing method refers to a method of printing internal electrode patterns, and sample chips were manufactured under the same condition in other processes except for the method of printing the internal electrode pattern. In A, internal electrode patterns were formed according to the method of manufacturing a multilayer electronic component according to an exemplary embodiment in the present disclosure described above, in G, internal electrode patterns were formed by a gravure printing method, and in S, internal electrode patterns were formed by a screen-printing method.

In Table 1, a line defect was measured in the region ML of the cross section of the body in the first and second directions or the region MW of the cross section of the body in the first and third directions, and was measured using the optical microscope and the SigmaScan Pro as described above.

Figure 10:
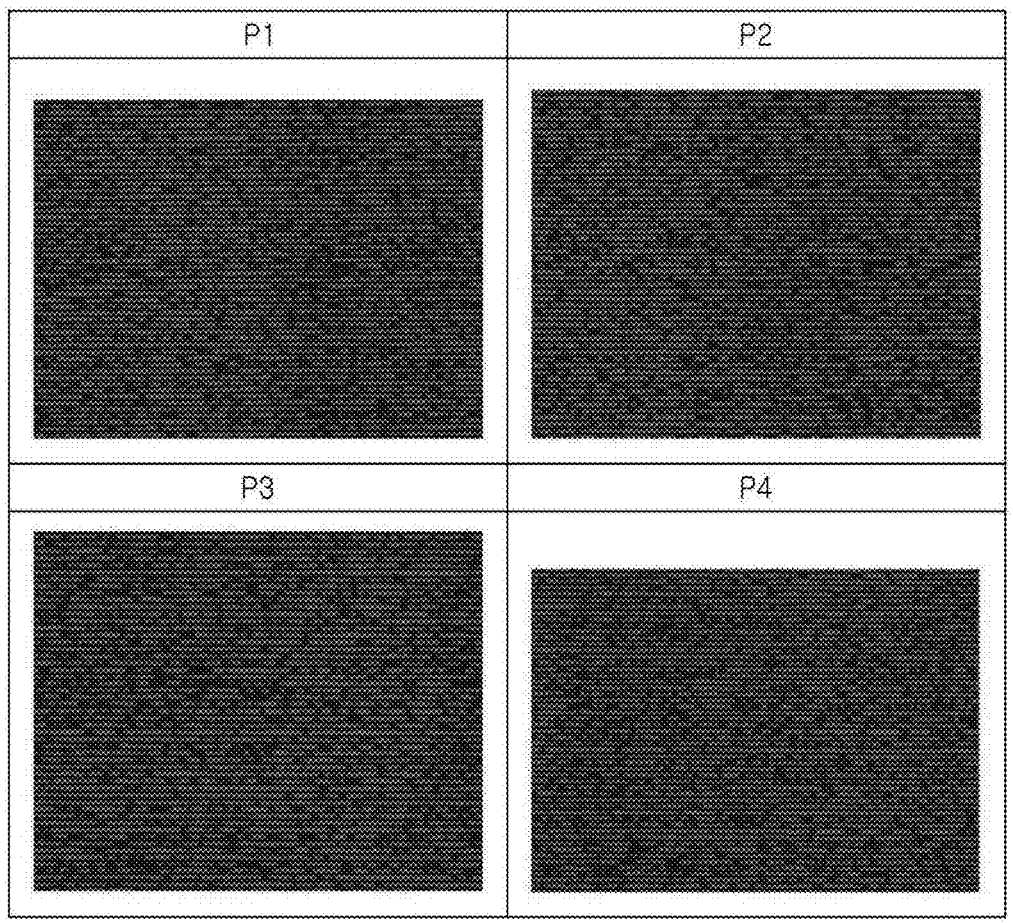
FIG. 10 is images obtained by scanning regions P1, P2, P3, and P4 of FIG. 8 with a scanning electron microscope (SEM)
Figure 15:
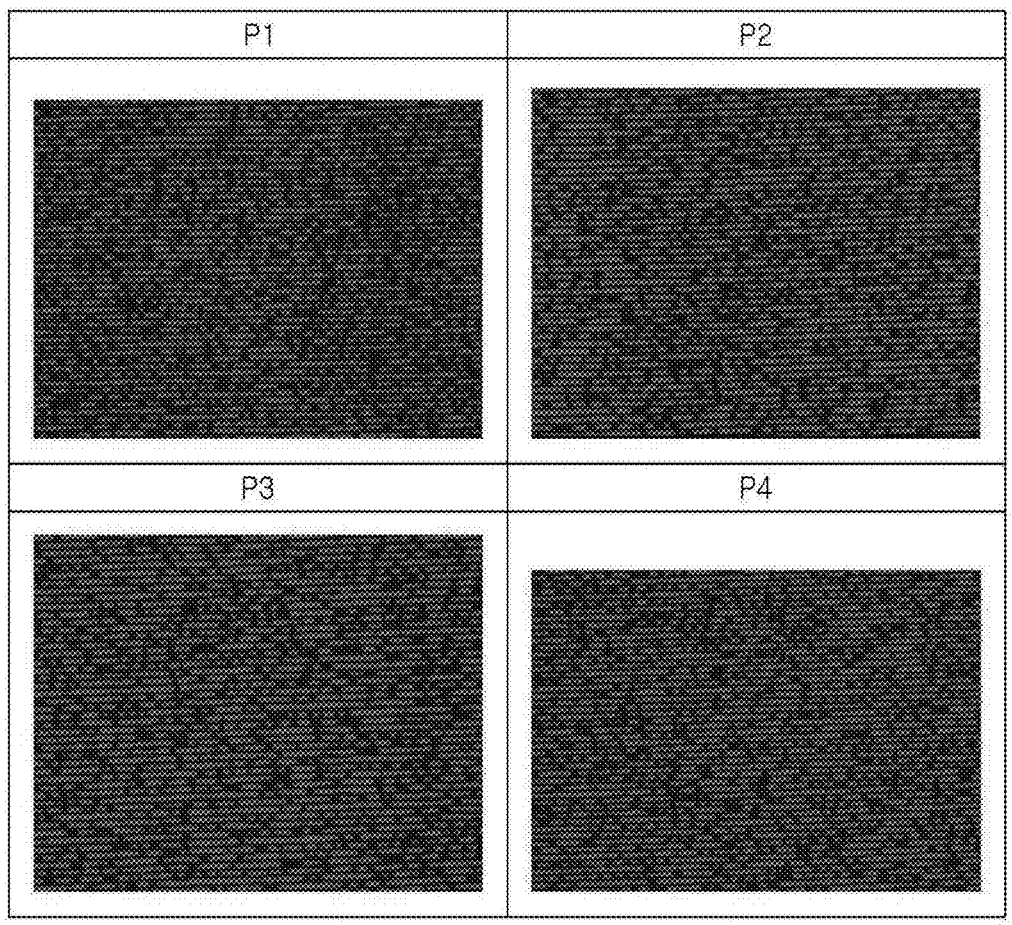
FIG. 15 is images obtained by scanning regions P1, P2, P3, and P4 of FIG. 13 with an SEM.
Figure 18:
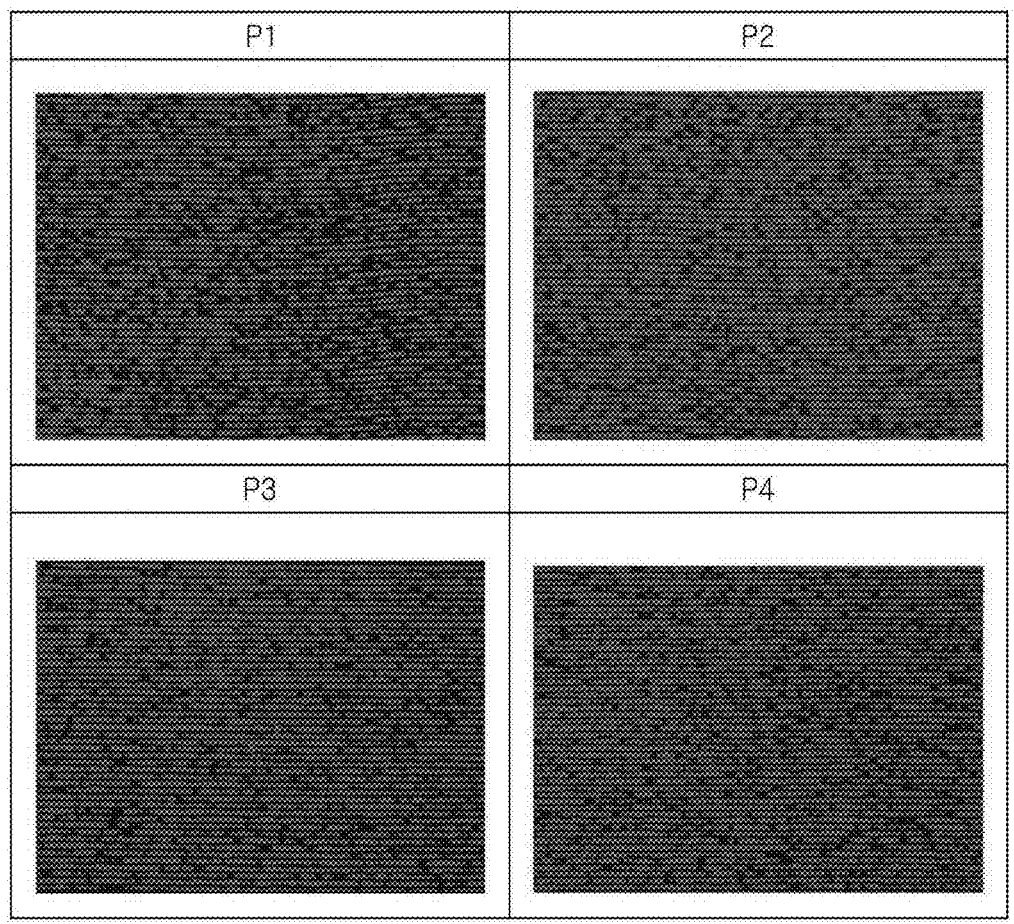
FIG. 18 is images obtained by scanning regions P1, P2, P3, and P4 of FIG. 16 with an SEM.

In Table 1, internal electrode connectivity was not measured for all Test Nos., and was measured for Test Nos. 1, 4, and 5. In Test No. 1, the internal electrode connectivity was measured in images of FIG. 10, which are images obtained by scanning regions P1, P2, P3, and P4 illustrated in FIG. 8 with an SEM, in Test No. 4, the internal electrode connectivity was measured in images of FIG. 15, which are images obtained by scanning regions P1, P2, P3, and P4 illustrated in FIG. 13 with an SEM, and in Test No. 5, the internal electrode connectivity was measured in images of FIG. 18, which are images obtained by scanning regions P1, P2, P3, and P4 illustrated in FIG. 16 with an SEM. Thereafter, each average value, standard deviation, and CV value were calculated and shown in Table 1.

In Table 1, as for a breakdown voltage (BDV) ratio, 100 sample chips were prepared for each Test No., a voltage at which a short-circuit occurs in a sample chip while increasing a voltage was set to a BDV, and a BDV average value for 100 samples was obtained. Ratios of average BDV values of Test Nos. 2 to 7 were shown as the BDV ratio, using a BDV average value of Test No. 1 as a reference value (100%).

TABLE 1

| Test No. | Method of Manufacturing Method | Measurement Region | Internal Electrode Connectivity (%) | | | | | Standard Deviation (%) | CV Value (%) | Line Defect (Area %) | BDV Ratio |
| --- | --- | --- | --- | --- | --- | --- | --- | --- | --- | --- | --- |
| | | | P1 | P2 | P3 | P4 | Average | | | | |
| 1 | A | ML | 87.6 | 88.4 | 87.3 | 88.2 | 87.9 | 0.44 | 0.50 | 0.0 | 100% |
| 2 | A | ML | 87.1 | 86.9 | 88.4 | 87.4 | 87.5 | 0.58 | 0.66 | 5.0 | 99% |
| 3 | A | ML | 83.3 | 85.3 | 86.1 | 85.7 | 85.1 | 1.08 | 1.27 | 7.2 | 93% |
| 4 | S | ML | 79.4 | 82.8 | 83.1 | 84.2 | 82.4 | 1.79 | 2.18 | 7.5 | 86% |
| 5 | G | MW | 79.8 | 82.1 | 85.6 | 86.3 | 83.5 | 2.64 | 3.16 | 58.2 | 82% |
| 6 | G | MW | — | — | — | — | — | — | — | 54.3 | 82% |
| 7 | G | ML | — | — | — | — | — | — | — | 23.4 | 85% |

In a case of Test No. 1, an area fraction of a line defect was 0 area %, such that BDV characteristics were very excellent, and a CV value of internal electrode connectivity was 0.50%, such that a distribution of the internal electrode connectivity was very excellent.

In addition, in a case of Test No. 2, an area fraction of a line defect was 5 area %, and a BDV ratio was 99%, which was close to 100%. In addition, in a case of Test No. 3, an area fraction of a line defect was 7.2 area %, and a BDV ratio was 93%.

In a case of Test Nos. 4 to 7, it may be confirmed that an area fraction of a line defect exceeded 7.2 area %, such that a standard deviation of internal electrode connectivity was high, and a BDV ratio was rapidly decreased to 86%.

Figure 19:
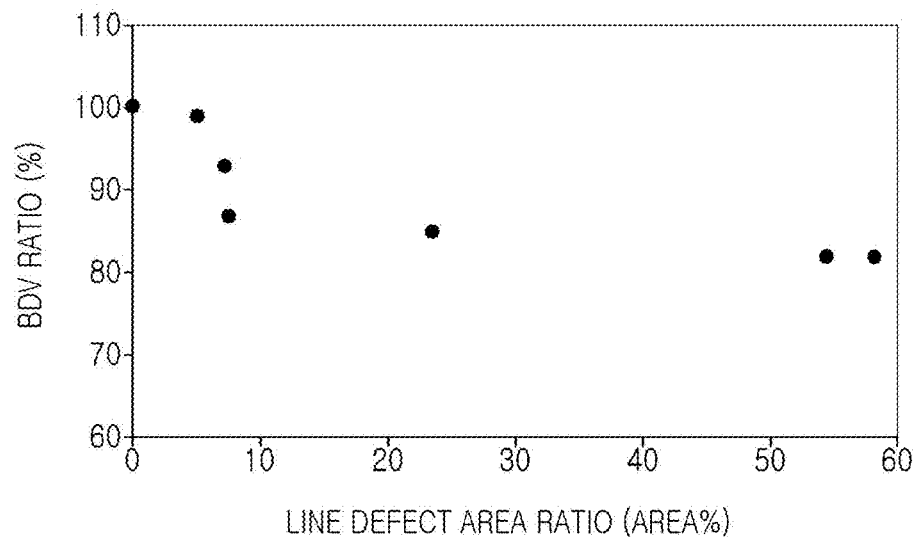
FIG. 19 is a graph illustrating a BDV ratio according to a line defect area ratio.

Referring to FIG. 19 illustrating BDV ratios according to line defect area ratios of Test Nos. 1 to 7, it may be confirmed that the BDV ratio is rapidly decreased when the line defect area ratio exceeds 7.2 area %.

As set forth above, according to an exemplary embodiment in the present disclosure, reliability of the multilayer electronic component may be improved by controlling the area fraction of the region in which the intensity of brightness in the capacitance formation portion is 110% or more and 126% or less of the average value of the intensity of brightness of the cover portion.

In addition, reliability of the multilayer electronic component may be improved by making the internal electrode connectivity uniform.

In addition, reliability of the multilayer electronic component may be improved by improving the smoothness of the internal electrodes.

In addition, the breakdown voltage of the multilayer electronic component may be improved.

Further, the multilayer electronic component having high reliability, a small size, and high capacitance may be provided.

Furthermore, capacitance of the multilayer electronic component per unit volume may be improved.

Moreover, the multilayer electronic component having excellent reliability while improving productivity may be manufactured.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, including a plurality of dielectric layers, and including a capacitance formation portion including a plurality of internal electrodes disposed alternately with the plurality of dielectric layers in the first direction and cover portions disposed on opposite end surfaces of the capacitance formation portion in the first direction; and
external electrodes disposed on the body,
wherein SL is 7.2 area % or less in which SL is a ratio of an area of NL to an area of ML, ML is a region excluding regions from opposite distal ends of the capacitance formation portion in the second direction to 35 μm from the capacitance formation portion of a region disposed in a center among regions obtained by trisecting a first cross section of the body in the first and second directions in the first direction, and NL is a region in which an intensity of brightness in ML is 110% or more and 126% or less of an average value of an intensity of brightness of one of the cover portions in the first cross section.

2. The multilayer electronic component of claim 1, wherein SL is 5.0 area % or less.

3. The multilayer electronic component of claim 1, wherein SW is 7.2 area % or less in which SW is a ratio of an area of NW to an area of MW, MW is a region excluding regions from opposite distal ends of the capacitance formation portion in the third direction to 35 μm from the capacitance formation portion of a region disposed in a center among regions obtained by trisecting a second cross section of the body in the first and third directions in the first direction, and NW is a region in which an intensity of brightness in MW is 110% or more and 126% or less of an average value of an intensity of brightness of the one of the cover portions in the second cross section.

4. The multilayer electronic component of claim 3, wherein SL or SW is 5.0 area % or less.

5. The multilayer electronic component of claim 3, wherein SL and SW is 5.0 area % or less.

6. The multilayer electronic component of claim 3, wherein all of SWs in three cross sections of the body cut in the first and third directions at three points having equal intervals in the second direction are 7.2 area % or less.

7. The multilayer electronic component of claim 3, wherein an average value of internal electrode connectivity in MW is 80% or more in which the internal electrode connectivity is a ratio of lengths of portions in which one of the plurality of internal electrodes is actually formed to a length of the one of plurality of the internal electrodes.

8. The multilayer electronic component of claim 3, wherein a standard deviation of internal electrode connectivity measured in MW is 1.5% or less in which the internal electrode connectivity is a ratio of lengths of portions in which one of the plurality of internal electrodes is actually formed to a length of the one of the plurality of internal electrodes.

9. The multilayer electronic component of claim 3, wherein a CV value of internal electrode connectivity in MW is 2.0% or less in which the internal electrode connectivity is a ratio of lengths of portions in which one of the plurality of internal electrodes is actually formed to a length of the one of the plurality of internal electrodes.

10. The multilayer electronic component of claim 1, wherein all of SLs in three cross sections of the body cut in the first and second directions at three points having equal intervals in the third direction are 7.2 area % or less.

11. The multilayer electronic component of claim 1, wherein an average value of internal electrode connectivity in ML is 80% or more in which the internal electrode connectivity is a ratio of lengths of portions in which one of the plurality of internal electrodes is actually formed to a length of the one of the plurality of internal electrodes.

12. The multilayer electronic component of claim 1, wherein a standard deviation of internal electrode connectivity in ML is 1.5% or less in which the internal electrode connectivity is a ratio of lengths of portions in which one of the internal electrodes is actually formed to a length of the one of the plurality of internal electrodes.

13. The multilayer electronic component of claim 1, wherein a CV value of internal electrode connectivity in ML is 2.0% or less in which the internal electrode connectivity is a ratio of lengths of portions in which one of the internal electrodes is actually formed to a length of the one of the plurality of internal electrodes.

14. The multilayer electronic component of claim 1, wherein an average thickness of one of the plurality of internal electrodes is 0.4 μm or less.

15. The multilayer electronic component of claim 1, wherein an average thickness of one of the plurality of dielectric layers is 0.45 μm or less.

16. The multilayer electronic component of claim 1, wherein an average thickness of the one of the cover portions is 15 µm or less.

17. The multilayer electronic component of claim 1, wherein a maximum size of the multilayer electronic component in the second direction is 0.66 mm or less, and a maximum size of the multilayer electronic component in the third direction is 0.33 mm or less.

18. A multilayer electronic component comprising:
- a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, including a plurality of dielectric layers, and including a capacitance formation portion including a plurality of internal electrodes disposed alternately with the plurality of dielectric layers in the first direction and cover portions disposed on opposite end surfaces of the capacitance formation portion in the first direction; and
- external electrodes disposed on the body,
- wherein a standard deviation of internal electrode connectivity in ML is 1.5% or less in which the internal electrode connectivity is a ratio of lengths of portions in which one of the plurality of internal electrodes is actually formed to a length of the one of the plurality of internal electrodes, and ML is a region excluding regions from opposite distal ends of the capacitance formation portion in the second direction to 35 µm from the capacitance formation portion of a region disposed in a center among regions obtained by trisecting a first cross section of the body in the first and second directions in the first direction.

19. The multilayer electronic component of claim 18, wherein a standard deviation of internal electrode connectivity in MW is 1.5% or less in which MW is a region excluding regions from opposite distal ends of the capacitance formation portion in the third direction to 35 µm from the capacitance formation portion of a region disposed in a center among regions obtained by trisecting a second cross section of the body in the first and third directions in the first direction.

20. The multilayer electronic component of claim 19, wherein an average value of the internal electrode connectivity in ML or MW is 80% or more.

21. The multilayer electronic component of claim 19, wherein a CV value of the internal electrode connectivity in ML or MW is 2.0% or less.

22. The multilayer electronic component of claim 19, wherein an average value of the internal electrode connectivity in ML and MW is 80% or more.

23. The multilayer electronic component of claim 19, wherein a CV value of the internal electrode connectivity in ML and MW is 2.0% or less.

24. The multilayer electronic component of claim 19, wherein SL or SW is 7.2 area % or less in which SL is a ratio of an area of NL to an area of ML, NL is a region in which an intensity of brightness in ML is 110% or more and 126% or less of an average value of an intensity of brightness of one of the cover portions in the first cross section, SW is a ratio of an area of NW to an area of MW, and NW is a region in which an intensity of brightness in MW is 110% or more and 126% or less of an average value of an intensity of brightness of the one of the cover portions in the second cross section.

25. The multilayer electronic component of claim 18, wherein all of standard deviations of internal electrode connectivity in MLs of three cross sections of the body cut in the first and second directions at three points having equal intervals in the third direction are 1.5% or less.

26. The multilayer electronic component of claim 18, wherein an average thickness of the one of the plurality of internal electrodes is 0.4 µm or less.

27. The multilayer electronic component of claim 18, wherein an average thickness of one of the plurality of dielectric layers is 0.45 µm or less.

28. The multilayer electronic component of claim 18, wherein an average thickness of one of the cover portions is 15 µm or less.

29. The multilayer electronic component of claim 18, wherein a maximum size of the multilayer electronic component in the second direction is 0.66 mm or less, and a maximum size of the multilayer electronic component in the third direction is 0.33 mm or less.

30. A multilayer electronic component comprising:
- a body having first and second surfaces opposing each other in a first direction, third and fourth surfaces connected to the first and second surfaces and opposing each other in a second direction, and fifth and sixth surfaces connected to the first to fourth surfaces and opposing each other in a third direction, including a plurality of dielectric layers, and including a capacitance formation portion including a plurality of internal electrodes disposed alternately with the plurality of dielectric layers in the first direction and cover portions disposed on opposite end surfaces of the capacitance formation portion in the first direction; and
- external electrodes disposed on the body,
- wherein a CV value of internal electrode connectivity in ML is 2.0% or less in which the internal electrode connectivity is a ratio of lengths of portions in which one of the plurality of internal electrodes is actually formed to a length of the one of the plurality of internal electrodes, and ML is a region excluding regions from opposite distal ends of the capacitance formation portion in the second direction to 35 µm from the capacitance formation portion of a region disposed in a center among regions obtained by trisecting a cross section of the body in the first and second directions in the first direction.

31. The multilayer electronic component of claim 30, wherein an average value of the internal electrode connectivity in ML or MW is 80% or more.

32. The multilayer electronic component of claim 30, wherein an average thickness of the one of the plurality of internal electrodes is 0.4 µm or less.

33. The multilayer electronic component of claim 30, wherein an average thickness of one of the plurality of dielectric layers is 0.45 µm or less.

* * * * *